United States Patent [19]

O'Sullivan

[11] Patent Number: 4,623,966
[45] Date of Patent: Nov. 18, 1986

[54] COLLISION AVOIDANCE APPARATUS

[75] Inventor: James P. O'Sullivan, Purley, England

[73] Assignee: Sperry Limited, Cobham, England

[21] Appl. No.: 580,510

[22] Filed: Feb. 15, 1984

[30] Foreign Application Priority Data

Feb. 19, 1983 [GB] United Kingdom ............... 8304686

[51] Int. Cl.⁴ ................ G06F 15/50; G01S 7/22
[52] U.S. Cl. .................. 364/461; 342/182; 342/455
[58] Field of Search ............. 364/460, 461, 443; 340/904, 901, 902, 903; 180/167, 168, 169; 343/7 A, 455, 5 EM

[56] References Cited

U.S. PATENT DOCUMENTS

| 3,717,873 | 2/1973 | Riggs | 343/5 EM |
| 3,725,918 | 4/1973 | Fleischer et al. | 343/5 EM |
| 3,939,334 | 2/1976 | Roth et al. | 364/461 |
| 4,153,935 | 5/1979 | Jones et al. | 364/461 |
| 4,313,115 | 1/1982 | O'Sullivan | 343/455 |
| 4,466,068 | 8/1984 | Degré et al. | 364/461 |

Primary Examiner—Gary Chin
Attorney, Agent, or Firm—Howard P. Terry

[57] ABSTRACT

Apparatus for assessing maneuvers of a first vehicle (6) so fitted relative to other vehicles (58, 68, 71-74) comprises sensing means for providing signals representative of the positions and velocities of the other vehicles relative to the first vehicle (6), computing means responsive to said signals for computing symbology respectively associated with the other vehicles, and display means coupled to the computing means for displaying the symbology relative to the position of the first vehicle, thereby providing indicia to assess maneuvers of the first vehicle which will avoid collision with the other vehicles, and which will ensure that the first vehicle will not pass closer to the other vehicles than a predetermined distance for all relative positions and velocities thereof, the symbology associated with each of the other vehicles in all encounter circumstances comprises at least a final escape point (FEP) (40) which, if reached by the first vehicle (6), will allow the first vehicle still to avoid the associated other vehicle by said predetermined distance, and two vectors (49, 50), originating at the FEP, for the first vehicle, which will take the latter clear ahead or clear astern of said other vehicle by said predetermined distance.

14 Claims, 12 Drawing Figures

COLLISION AVOIDANCE APPARATUS

This invention relates to apparatus for providing effective indicia for the assessment of present actions or possible maneuvers of a first craft as an aid for avoiding unnecessarily close approaches, and hence collisions, with vehicles being encountered, or with certain terrestrial obstructions. The invention is particularly, but not exclusively, suitable for marine vessels and in the main will be discussed in relation thereto.

Radio and other aids to marine navigation, which have been utilized in the past for augmenting the lookout's ability visually to determine potential collisions between marine vessels, have become mandatory on certain vessels following pronouncements by the International Maritime Organization, an agency of the United Nations. Radar systems and similar sensors have been used to determine the bearings and ranges and their associated rates corresponding to intruding vessels. However, the detection of small bearing rates at large ranges alone does not lend itself to accurate instrumentation since small errors by the successive bearing readings can destroy the accuracy of prediction of the closest point of approach (CPA) of the intruding vessel.

Other prior art collision warning techniques have utilized the measurement of passing distance at the closest point of approach. In such systems, radar indicators, reflection plotters and plotting tables are often used. However, the tedium of plotting can seriously degrade the reliability of these methods. Generally, an operator cannot accurately plot the data and assess from it the degree of danger associated with more than three intruding targets simultaneously. Semi-automatic transfer of radar data to plotting boards has been attempted, but the instrumentation is expensive.

In addition to the above disadvantages, collision avoidance systems that utilise the CPA parameter suffer from a further disadvantage. When own ship changes heading, the time of CPA changes radically and in a manner difficult to visualize. Knowing only the coordinates of the presently predicted CPA does not permit the prediction of the value of CPA for other headings of own ship which may become necessary. The character of displays emphasizing the CPA criterion is indeed such that it is possible to predict CPA data corresponding to only the threat for present ship's speed and heading without any indication of dangers along a new heading such as one to avoid a present danger. Displays of CPA's for trial headings and speeds have been incorporated in some devices in the past, but this approach is time consuming, incomplete, and requires the operator to remember the result of previous trials.

Typical collision warning system of the above-described type do not in a fully accurate or rapid manner furnish data directly usable in reliably assessing what maneuver own ship must make in order effectively to avoid an impending collision. The ship's operator must, upon observation of a collision potential, apply various rules and customs such as the International Regulations for the Prevention of Collisions and the Inland Rules of the Road which have been devised to prevent collisions. The Steering and Sailing Rules which form part of the aforementioned regulations must also be followed whenever ships are in sight of each other and there is risk of collision. Special rules and conventions cover the behavior of vessels in poor visibility. It is left to the ship's operator after the warning of an impending collision to exercise a difficult judgement as to what maneuver he must order the ship to make so as to remove the risk of collision. The required space for a safe maneuver depends upon knowledge of many factors, such as knowledge of the intruding vessel's future relative locations.

A collision avoidance system that endeavors to obviate the disadvantages discussed above utilizes the predicted point of collision (PPC) parameter. Such a system is described in U.S. Pat. No. 3,717,873 which displays the PPC of own ship (first vessel) with respect to intruding vessels.

U.S. Pat. No. 3,725,918 discloses a system which improves upon that of U.S. Pat. No. 3,717,873 by replacing the circular PAD area by a closed, elongated geometrical curve, preferably an ellipse.

The elliptical PAD area was drawn by determining two immediate minimum changes in own ship heading which would provide new headings for own ship arranged to pass ahead and astern, respectively, of the intruding vessel. The points of intersection of these headings with the heading of the intruding vessel define the extent of the major axis of the ellipse, which was thus aligned with the heading of the intruding vessel, the minor axis being determined by the selected CPA (typically 1 nautical mile) and being equal to twice CPA.

The elliptical PAD approach was further improved upon by the system disclosed in U.S. Pat. No. 4,313,115 which set out to overcome some minor disadvantages of the system of U.S. Pat. No. 3,725,918. In particular, it was deemed advantageous to indicate on the display the actual locations of both the PPC on the extension of the track of the target or intruding vessel, and the location of points which would be occupied by the first vessel (own ship) at the moment when the closest point of approach (CPA) was reached when either of the two alternative clearing headings to achieve that CPA was adopted by the first vessel. These three specifically defined locations, and their duplicates which arise in certain cases when the intruding vessel is faster than the first vessel, or two of them only which exist in the late stages of an encounter with an intruding vessel which is faster than the first vessel, were used to define a PAD area on the PPI display of the first vessel. Certain advantages were anticipated in defining the PAD symbol in this manner. In particular, it was thought advantageous to display the PPC and CPA positions discretely on the PPI to aid the navigator's interpretation of the hazard generated by each encounter or intruding vessel, and it was anticipated that benefit would result in distinguishing between the cases in encounters with faster intruding vessels in which PPC's are present, and those cases late in the encounters in which the PPC's merge and cease to exist, representing the situation in which it was possible, by selection of the identified headings, to pass closer than the stipulated minimum passing distance with respect to the intruding vessel without overhauling and colliding with the latter.

A PAD symbol constructed in this manner would be responsive in terms of its changing proportions and dimensions to those occasions, albeit rare, when it is necessary to enter a PAD symbol. Furthermore, certain improvements in the area encompassed by the PAD symbol, in particular that region lying on the far side of the intruding vessel's track line, would result. While these advantages of the CPA-linked PAD approach of U.S. Pat. No. 4,313,115 were achieved, a disadvantage arose, namely the inability to exercise control over the dimensions of the PAD symbol as the first vessel (own ship) crossed ahead or astern of the intruding or target vessel's track line.

To summarize, the experience which has shown computer-aided processing of radar data to have a profound impact on the interpretation of the marine traffic encounter situation, providing essential and relevant information in a rapid and accurate manner hitherto obtained only indirectly and tediously by manual plotting which is susceptible to human error has received legislative support and is accepted in the maritime industry. Collision avoidance systems have highlighted the necessity for devoting careful attention to the election of inputs of own ship speed and heading to the display drive circuits and to the data processor itself, as this choice exercizes a direct influence on the accuracy and relevancy of the derived target motion parameters and upon the interpretation of the encounter hazard. It is further appreciated that although any radar data processor approach, including manual plotting, is susceptible to residual errors in speed and heading inputs, the fundamental CPA information—time interval to, and magnitude of, ultimate closest passing for present motions of own ship and target, is independent of the influences of these errors provided systematic observation has been conducted. This situation explains and emphasizes the fundamental strengths of the radar sub-system as an important aid to safety of navigation.

Furthermore, the techniques of displaying target hazard information by means of predicted areas of danger (PAD) as contained in the prior art, and now refined by the present invention, is known to provide additional and important advantages in assessment of the total situation displayed on the plan position indicator (PPI). A fundamental but previously unrecognized dichotomy in the display of collision hazard in respect to fixed terrestrial returns—the navigational problem—and with respect to ship targets possessing a variety of motions—the collision avoidance problem—has been highlighted and resolved. When viewing the PPI of the fundamental "sea" stabilised relative motion radar, the navigator had an intuitive appreciation of the hazard posed by the surrounding returns from fixed terrestrial objects, such as land returns and navigation marks subject to an element of uncertainty due to tidal disturbance and residual error influences. It was discovered that this intuitive assessment strength did not extend to the interpretation of the motions of mobile ship targets. Many, if not all, of the successive difficulties of interpretation of the radar plot can be attributed to this dichotomy. When target motions are processed and hazard information displayed through the medium of a PAD, this dichotomy is resolved. At the moment of observation, the navigation and collision hazards are displayed in a single compatible format: the land returns are seen in their present locations with respect to own ship's position on the relative motion indicator and their future locations are assessed by visualizing own ship's future progress along the heading marker or, conversely, visualizing the future progress of the land down the PPI with negative of own ship's components of motion. The PAD distribution is seen likewise in its present locations with respect to own ship's position and its future locations are assessed by visualizing own ship's progress along the heading marker or, conversely, visualizing the future progress of the PADs down the PPI, similarly with a principal component of motion being equivalent to the negative of own ship's motion, being influenced further by the direction of the target vessel's own direction of motion to an increasing extent as a function of the lateral distance of the PAD area from the heading marker. In general, both the present location of land returns and PAD areas and their future movement are assessed in one similar convention, the latter subject likewise to an element of uncertainty which is related to the rate of change of the bearing of the target vessel. This permits a direct and intuitive assessment of the total hazard situation, as it exists at the moment of observation and as it is predicted to exist in the future, representing a significant contribution to effectiveness in information-handling and an improvement in safety.

According to the present invention apparatus for assessing maneuvers of a first vehicle relative to other vehicles comprises sensing means for providing signals representative of the positions and velocities of the other vehicles relative to the first vehicle, computing means responsive to said signals for computing symbology respectively associated with the other vehicles, and display means coupled to the computing means for displaying the symbology relative to the position of the first vehicle, thereby providing indicia to assess maneuvers of the first vehicle which will avoid collision with the other vehicles, and which will ensure that the first vehicle will not pass closer to the other vehicles than a predetermined distance for all relative positions and velocities thereof, characterized in that the symbology associated with each of the other vehicles in all encounter circumstances comprises at least a final escape point (FEP) which, if reached by the first vehicle, will allow the first vehicle still to avoid the associated other vehicle by said predetermined distance, and two vectors, originating at the FEP, for the first vehicle which will take the latter clear ahead or clear astern of said other vehicle by said predetermined distance.

Preferably, the symbology associated with each of the other vehicles is in the form of at least one closed region representing a predicted area of danger (PAD area), the periphery of each region being defined by lines joining certain points which are determined according to the hazard category of the other vehicles but in each case these points including the FEP and the ends of vectors representing the two clearing headings originating at the FEP, the latter representing the closest points of approach (CPA) to the other vehicle as set by said predetermined distance. In the majority of cases, said certain points will also include the possible points of collision (PPC) of the first vehicle with the other vehicle.

Preferably, the FEP is determined by the following rules:

1. For faster intruding vehicles possessing duplex PADs, the FEPs are located at the particular point along the directions of headings towards either PPC representing the final position from which a heading is available to the first vehicle from which the latter is capable of passing clear ahead of the intruding vehicle with the predetermined CPA distance.
2. For a slower intruding vehicle, the ratio of the speed of which with respect to the speed of the first vehicle is greater than a predetermined constant, such as ⅙, and the aspect angle of which is less than a right angle, the FEP is the particular point along the direction of the heading towards the single PPC at which the range to the intruding vehicle bears a fixed ratio with respect to the preselected CPA distance. The ratio of range at FEP to preselected CPA distance may be 1.5:1 for example.

3. For a slower intruding vehicle the speed ratio in respect of which is less than a predetermined constant, such as the value of ⅓ suggested in Rule 2 above, or for a slower intruding vehicle the aspect angle of which is greater than a right angle, the FEP is the particular point along the direction of the heading towards the PPC at which the range to the intruding vehicle bears a fixed ratio to the preselected CPA distance. The ratio of range at FEP to preselected CPA distance may be 1.1:1, for example, in this case.

4. For a faster intruding vehicle displaying duplex PAD areas at the moment when the nearer of the two FEPs approaches to a range from the first vehicle which bears a fixed ratio to the pre-selected CPA distance of 1.1:1, for example in a situation in which the heading of the first vehicle lies outside the sector established by the primary and dual PPC positions related to the target passing astern, steaming through which sector is equivalent to the first vehicle crossing the bow of the faster intruding vehicle, the rule for the range to the target at FEP will be changed from that established by Rule 1 to one which will ensure that the final CPA distance which will result from the first vehicle altering its heading on reaching the FEP to a heading parallel to the intruder's heading will bear a fixed ratio to the pre-selected CPA distance of 1.1:1, for example. This Rule is invoked at a precise stage in the approach to the FEP in an encounter with a faster intruding vehicle at which the first vehicle has not indicated its intention to adopt the maneuver to cross ahead of it. Rule 4 causes the duplex PADs to be merged at a slightly earlier stage in the encounter.

5. If the heading of the first vehicle lies within the sector defined in Rule 4, indicating the intention of the first vehicle to cross ahead of the intruding vehicle, as the range to the nearer FEP reaches a predetermined amount (for example 1.1 times the preselected CPA distance), or if the first vehicle maneuvers subsequently to cross the bow of an intruding vehicle showing an occluded PAD, the parameters defined in Rule 1 will be maintained or reestablished if possible, until the duplex PADs of the intruding vessel merge at a position along its trackline which is determined by the intersection of the trackline with the predicted heading of the first vehicle known as the heading for minimum CPA, which will occur some time after the first vehicle has crossed the bow of the intruding vehicle, thereupon the FEP Rule will be changed to the relationships established by Rule 4.

It will be seen from the above five FEP rules that encounters with intruding vehicles are subdivided in categories of hazard determined largely by speed ratio parameters and by relative locations.

The system may be so organized that additional allowances can be introduced into the computational process which set the locations of the elements establishing the nearside periphery of the PAD symbol, the FEP, the escape vectors and their terminal points, in any of three ways:

1. By moderating the predetermined ratios used with CPA distance to establish the FEP Rules.
2. By increasing CPA distance by a predetermined additional ratio prior to computing the length and direction of the escape vectors emaninating from the FEP or FEPs.
3. By elongating the escape vectors by a fixed linear magnitude, for example the length of own ship which is typically 1,000 feet (304.8 m)

Furthermore, it is possible to provide the user with facilities to introduce an additional safety margin ratio to increase the ratios mentioned in 1 above.

The symbology generated in accordance with the present invention is highly instructive in that it possesses reality only if the first vehicle is approaching a region or area encompassed by a symbol, which region is significant by virtue of the presence therein of another vehicle in the event that it is entered, when the important items of information needed are the time interval to the final moment when an evasive maneuver must be undertaken to establish the preselected CPA distance, and an indication of the magnitude and direction of the evasive action required when the FEP is reached to achieve the preselected CPA distance. This approach represents a notable improvement upon the prior art in which the symbology provides an indication of the action necessary at the moment of observation to establish the desired CPA distance, but does not emphasize the more important situation in which it is necessary to approach an area of hazard, when the required information would then be linked to action which would need to be taken in the future.

The display of the ultimate CPA positions for the first vehicle which are based upon heading towards the maximum hazard until the FEP is reached and then adopting one of two clearing headings is of value in determining a less critical approach, whether it be heading towards the FEP but maneuvering before reaching it, or heading towards the indicated CPA positions directly, which is equivalent to adopting a heading tangential to the PAD symbol. In the latter case, the first vehicle will arrive at the indicated CPA position earlier than if it steamed via the FEP route. The result of this type of maneuver will be different depending on which side of the PAD symbol is being approached. When passing "in front of" the PAD area, or "in front of" the primary PAD area of certain faster targets (ahead of the other vehicle), then arriving early at the astern CPA position linked to the FEP will result in the actual CPA occurring later and having a larger magnitude than the predetermined distance. As this is a critical maneuver, the additional margin of safety is beneficial. As time elapses when undertaking this maneuver, the PAD symbol will exhibit a slight tendency to move away from the heading marker of the first vehicle, providing a clear indication that a CPA in excess of the preselected value is being established.

When passing "behind" the PAD area, the early arrival of the first vehicle at the FEP-linked ahead CPA position has the effect of creating a CPA distance which is less than the preselected distance for the CPA. As time elapses when undertaking this maneuver, the PAD symbol exhibits a tendency to creep across the first vehicle heading marker, providing a distinct alert of the necessity to adjust the heading until it is once again "tangential" to the PAD symbol.

Means for predicting the results of evasive maneuvers of a first vessel in the vicinity of a multiplicity of target vessels have been established by custom and have been addressed in the prior art. The PAD display technique described in the previously mentioned U.S. Pat. Nos. 3,725,918 and 4,313,115 possesses a distinctive capability in this regard: the effects of any alternation of own ship's heading at present speed are contained inherently in the display format, which obviates the need to incorporate facilities for trial heading investigations. Facilities for trial speed investigations are provided and this aspect of the prior art is retained in the collision avoidance apparatus in accordance with the present invention.

Two additional evasive maneuver facilities associated with the FEP-type PAD symbol may be incorporated as follows:

1. The collision avoidance apparatus in accordance with the present invention may be provided with a trial heading mode of operation in conjunction with the control facilities of the electronic bearing cursor which, when the cursor is rotated and comes into contact with a PAD symbol, and an EXECUTE control activated, the FEP location for that symbol will be computed on the basis of its being located on the heading of own ship represented by the present direction of the bearing cursor rather than on the heading of own ship which is directed towards the PPC, as is the case in normal operation. This facility improves the accuracy of hazard representation provided by the PAD symbol in the present invention.

2. The collision avoidance apparatus in accordance with the present invention may be provided further with a single step or duplex step own ship maneuver-effect prediction which will be initiated in conjunction with the acquisition symbol and its joystick or trackball control mechanism. The single step own ship maneuver prediction may be activated by positioning the acquisition symbol at a location on the PPI representing a future location of own ship, with which will be associated an elapsed time interval at own ship's present speed, and executing the prediction command. Immediately the computer will cancel the normal range rings, vectors, tracklines and PAD symbols for all targets and establish a predictive display of the following format:

(i) Own ship's heading marker segments will be changed to hatched or broken lines;

(ii) A hatched predictive representation of the segmented heading Marker will be drawn in the direction from the acquisition symbol equivalent to the direction from the PPI sweep center to the acquisition symbol;

(iii) Hatched range rings of the same separation as when in the normal mode of display will be drawn concentric with the center of the acquisition symbol;

(iv) The predicted relative location of the target on the assumption that own ship has steamed to take up the position represented by the acquisition symbol and assuming that the target maintains steady motion over this time interval will be marked with a symbol which could be of proportions and characteristic equivalent to the acquisition symbol;

(iv) The vector of the target will be projected from this predicted location and its trackline to the new location of the predicted PPC and the symbology of the PAD area will be created for the changed circumstances of the prediction, making use of present techniques to provide an unambiguous indication that the display is being operated in a predictive mode, such as displaying a symbol 'T' meaning "trial" at the bottom of the PPI and/or by means of flashing the predictive symbology generated.

This predictive capability enables an assessment to be made, effortlessly, of the consequences of a single specific and immediate change of own ship's heading at present speed. The predictive facility may be executed in a similar manner if a trial speed for own ship is first entered into the trial maneuver sub-system.

A two-step prediction may be established by locating the acquisition symbol at two specific locations in sequence, the predictive display being created on the basis that own ship steams towards the first location and then adopts a heading to reach the second and final location of the acquisition symbol, thereby simulating the effects of a deferred maneuver.

Collision avoidance apparatus for a marine vessel in accordance with the present invention will now be described in greater detail by way of example, with reference to the accompanying drawings, in which.

Figure 1:
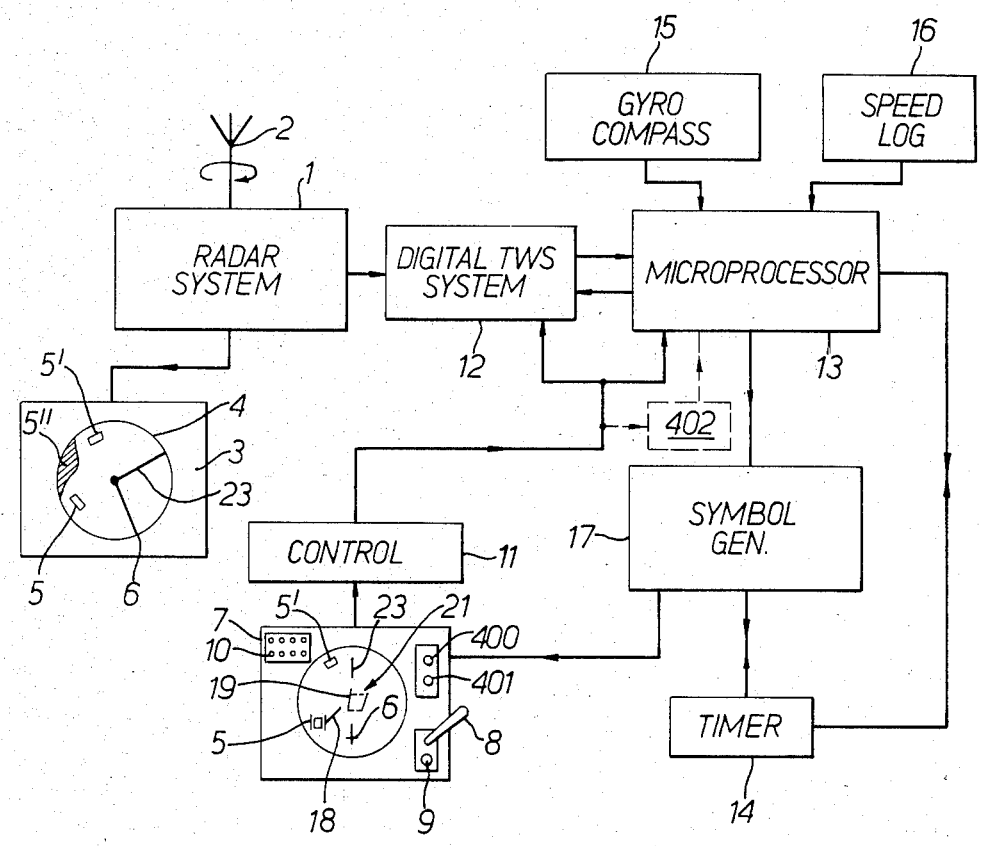
FIG. 1 is a block diagram of the apparatus.

The apparatus of FIG. 1 comprises a conventional azimuth scanning pulse radar system 1 of the type widely used in marine radar applications and employing a directive azimuth-scanning antenna 2. The radar antenna azimuth or bearing data and detected target range data is used to generate in a conventional way a type P or plan position indicator (PPI) display 3 on the screen of a cathode ray tube 4. Thus, when the display is an off-set type P display, all targets (moving and stationary) in the range of the radar 1 are periodically itensified on the screen of the cathode ray tube 4. A moving target in the form of a vessel is indicated at 5 while the location of own ship is represented at 6. Additional targets such as 5' will appear on the display 3, together with reflections from fixed obstacles including land masses 5", if present. The display 3 has a heading marker 23 (a radial line extending from 6 to the periphery of the cathode ray tube 4), which indicates the present heading of own ship. The type P display is inherently a collision warning display and so it is shown in FIG. 1 as representative of collision warning or collision assessment displays in general.

The radar video signal contents of the display 3 are repeated on a maneuver assessment display 7 which also employs a cathode ray tube. The display 7 is provided with target acquisition means comprising a joystick 8 and a button 9, by which selected targets can be entered into the maneuver assessment system yet to be described. The display 7 also has a panel 10 for general control functions, including the selection of the CPA distance, and two buttons or the like 400 and 401 associated with a predictive mode of the apparatus which will be described. The operator of own ship 6 normally selects all significant newly detected targets for acquisition and acquisition is effected by taking hold of the joystick 8, whereupon a circle or square acquisition signal (not shown) appears at the geometric center of the display 7. Movement of the joystick 8 results in movement of the circle or square which can thus be positioned over the target of concern and the button 9 then pressed to effect acquisition. Depression of the button 9 actuates control means 11 the output of which is fed both to a conventional digital track-while-scan (TWS) system 12 and a microprocessor 13. The TWS system 12 has an input connected to the output of the radar system 1 and has a two-way link with the computer 13. The microprocessor 13 also has a two-way link with a timer 14 and receives inputs from a gyro-compass 15 and speed log 16 of own ship. An output of the microprocessor 13 is fed to a symbol generator 17 which has a two-way link with the timer 14 and an output applied to the display 7 which produces a symbol associated with the selected target as will be described in greater detail hereinafter but can be seen associated with the acquired target 5 in the display 7 of FIG. 1 but not in connection with the non-acquired target 5'.

The TWS system 12 stores the rectangular or polar coordinates of each selected target and automatic lock-on to signals received directly from the radar system 1 as the antenna 2 sweeps the respective selected targets is effected, so that the stored data for each selected target is updated automatically. Thus, for example, smoothed relative coordinates $\hat{x}$ and $\hat{y}$ and rates $\hat{\dot{x}}$ and $\hat{\dot{y}}$ may be stored for any target. Entry of a new or next apparently dangerous target generates a second set of x, $\hat{y}$, $\hat{\dot{x}}$ and $\hat{\dot{y}}$ data for storage within the TWS system 12 for the newly-selected target. Such relative $\hat{x}$, $\hat{y}$, $\hat{\dot{x}}$ and $\hat{\dot{y}}$ data may be stored at the will of the operator in this manner for a plurality of intruding vessels for supply, upon demand and on a time-shared basis, to the microprocessor 13. The TWS system 12 may be either analogue or digital, the latter being the presently preferred method, and may be supplied, if required, in a conventional manner by analogue-to-digital or digital-to-analogue converters as interface elements between various components of the system and the microprocessor 13. It will be understood that the TWS system 12 is actually a type of computer device in itself, performing arithmetic functions, such as differentiation, averaging, and storing data. Therefore, it will be understood that its function may be performed either in a discrete unit, such as the separate system 12 shown in FIG. 1, or that its arithmetic and storage operations may be performed by respective arithmetic and storage elements present in the microprocessor 13. The latter elements may perform other system functions in a conventional manner on a time-sharing basis. In another approach, the intruding vessels may be acquired automatically when they enter a predetermined range and azimuth annular ring or rings surrounding the first vessel (own ship).

The microprocessor 13 has several computations to perform to assist in the generation of manuever assessment symbols by the generator 17. It will be appreciated that the stored $\hat{x}$ and $\hat{y}$ coordinates of the various targets are readily available in the TWS system 12 and since the motions of the selected targets will be relatively slow compared with the speed of operation of even the simplest microprocessor, it is seen that it is not necessary to compute all of the data in real time and, consequently, the threat or hazard data is conveniently stored and up-dated only periodically by the TWS system 12. It will also be understood that a plurality of symbols may be generated on a time-sharing or multiplexing basis using techniques well known in the analogue and digital computer arts.

It will be apparent that the $\hat{x}$ and $\hat{y}$ coordinates of the target 5 substantially represent the present rectangular coordinates of the target vessel relative to own ship at the PPI center and stabilised in azimuth in either North-up or Head-up (as selected) presentation. However, it will be understood that the discussion of the location of target 5 and of the coordinate characteristics of other elements of the symbol to be generated could equally well be discussed in the same manner if polar coordinates were in use in the system. The microprocessor 13 may be supplied with a self-contained clock or timing system which dominates the operation of other elements of the system, or it may be under the control of the separate timer 14. For example, the timer 14 may be synchronized with a clock internal of the microprocessor 13. On the other hand, the timer 14 may represent the major system clock, determining the timing of the microprocessor 13 by the agency of signals transmitted to it from the microprocessor. In what follows, the timer 14 will, as a matter of convenience, be taken as the basic timer or clock control for the system.

The microprocessor 13 may be programmed so as periodically to derive, from the TWS system 12, the $\hat{x}$ and $\hat{y}$ coordinates of the target 5 and to supply by well-known means coordinate values as control signals to the display thus to cause the cathode ray beam to be instantaneously intensified so as to form a pair of synthetic eyebrows which straddle the target's radar video at point 5 on the display 7. The next function of the microprocessor 13 is to cooperate with the symbol generator 17 in forming a predicted true track 18 of the target 5. The track 18 is drawn from the present position of the target 5 to a predicted point 19 of probable collision (PPC) determined by the relative position of the target vessel and its heading and speed and the present speed only of own ship 6. The microprocessor 13 applies the $\hat{x}$ and $\hat{y}$ coordinates of target 5 to the symbol generator, and also supplies the $\hat{x}$ and $\hat{y}$ coordinates of the PPC 19, having used the x, $\hat{y}$, $\hat{\dot{x}}$ and $\hat{\dot{y}}$ information generated by the TWS system 12 to generate such values. The symbol generator 17 will then supply, substantially instantaneously following the intensification of point 5, component sweep voltages for generating the track 18. Apparatus suitable for performing the function of the symbol generator 17, both in analogue and digital forms, is well known in the art as discussed in U.S. Pat. No. 3,717,873 for example.

Following the generation of the vector representing the predicted track 18 of the target vessel 5, the $\hat{x}$ and $\hat{y}$ coordinates of the PPC 19 remain available in the computer 13 and are now used to generate a predicted area of danger (PAD) area 21 representing a region to be avoided if possible collision, or unacceptable close passing, is to be avoided. The track 18 and PAD area 21 may be drawn simultaneously or nearly so, as desired. A dual gun cathode ray tube employing corresponding sets of electrostatic deflection electrodes for each electron beam permits drawing the track 18 with one gun-beam deflection system and the PAD area 21 with the second gun-beam deflection system. Single gun operation with a single deflection system may be used, for example, with the track 18 being traced instantaneously prior to the tracing of the PAD area 21.

The display 7 may employ an ordinary type of cathode ray tube in which the decay period of the phosphor on the display screen is selected so that a symbol traced in the past has substantially faded by the time the microprocessor 13 calls for upgrading of the display. Alternatively, raw analogue radar video may be digitized, stored in a register and reproduced on the PPI display 7 at a high refresh rate, typically fifteen times per second, or faster, whereby the radar video is presented as bright, fade-free signals, the consistency of which is equivalent to that of the microprocessor—generated synthetic symbols. Regular or random erasure of the display may also be accomplished under the control of the microprocessor 13 when a conventional direct viewing storage type of cathode ray display is employed. Such erasure may also be accomplished, as in the past, at any time desired by the operator.

Figure 3:
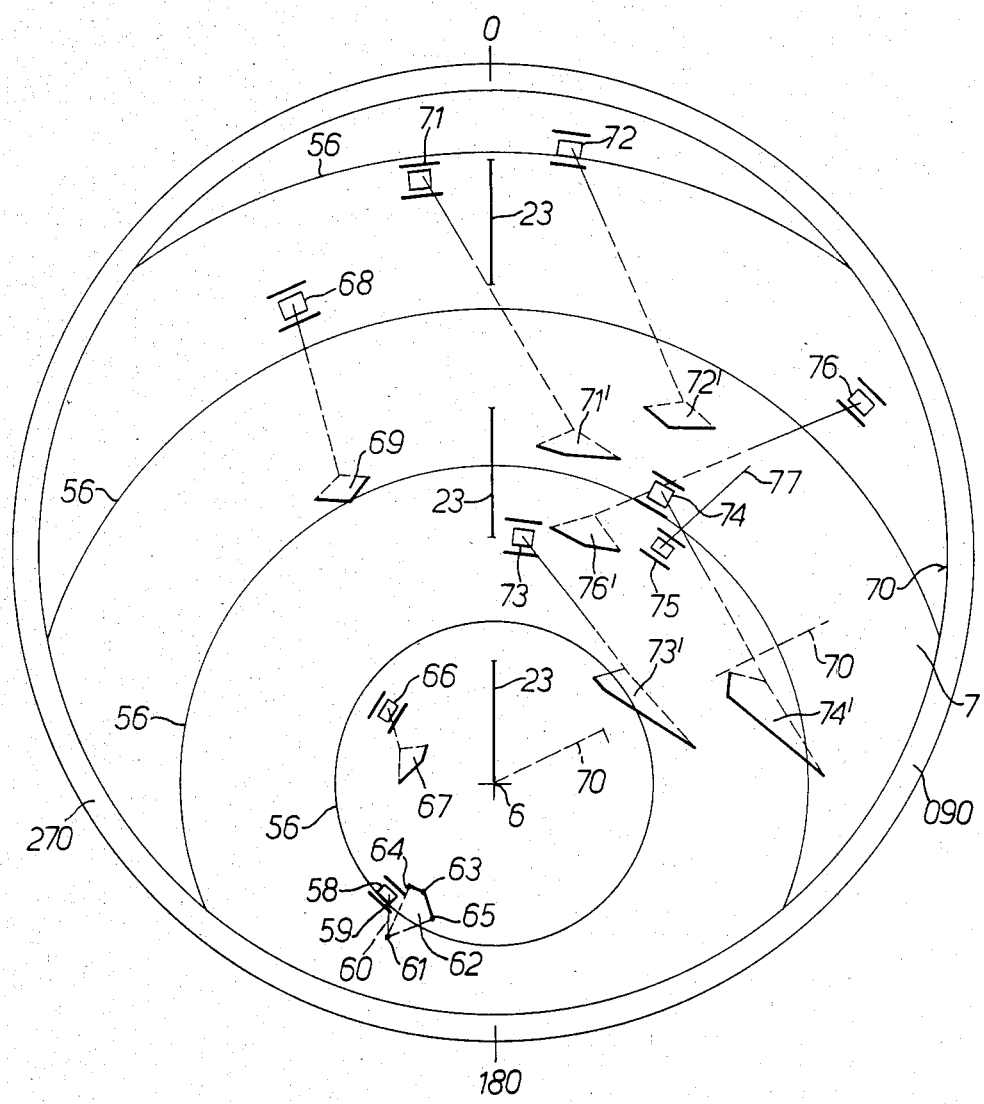
FIG. 3 is an enlarged view of a cathode ray tube display of FIG. 1, FIGS. 4 to 12 show the sequence of change of one part of the display of FIG. 3.

Variations of the system displacements illustrated in FIG. 3 are readily apparent that may lend even greater versatility to the maneuver assessment display system. It is seen that the acquisition means 8, 9 or a similar device, may be used to pick off coordinate data from the display of a long range or early warning radar system or from a sonar display or other proximity warning display or device. By means of the TWS system 12, the operator may cause the system to lock on to, and to track, any selected hazard detected by any available sensor. The relative bearings and ranges of the targets locked into the automatic tracking operation are readily available in upgraded form for manipulation by the microprocessor 13 for generating data required by the symbol generator 17 for producing the synthetic outputs on the display 7.

Data, while present in the microprocessor 13, may be manipulated or refined by the use of inertial stabilizing information such as generated by the gyrocompass 15 or speed log 16. In this manner, the threat bearing may be corrected for own ship roll, pitch or yaw motions in a conventional manner, as a refinement of the invention. Alternatively, the data generated by the radar system 1 may be provided with inherent stabilization features by the direct servo stabilization of the antenna scanner 2. Functions not directly related to the collision avoidance and maneuver assessment functions may also be performed by the computer 13 on a time-sharing basis, such as radar navigational functions and the like.

Figure 2:
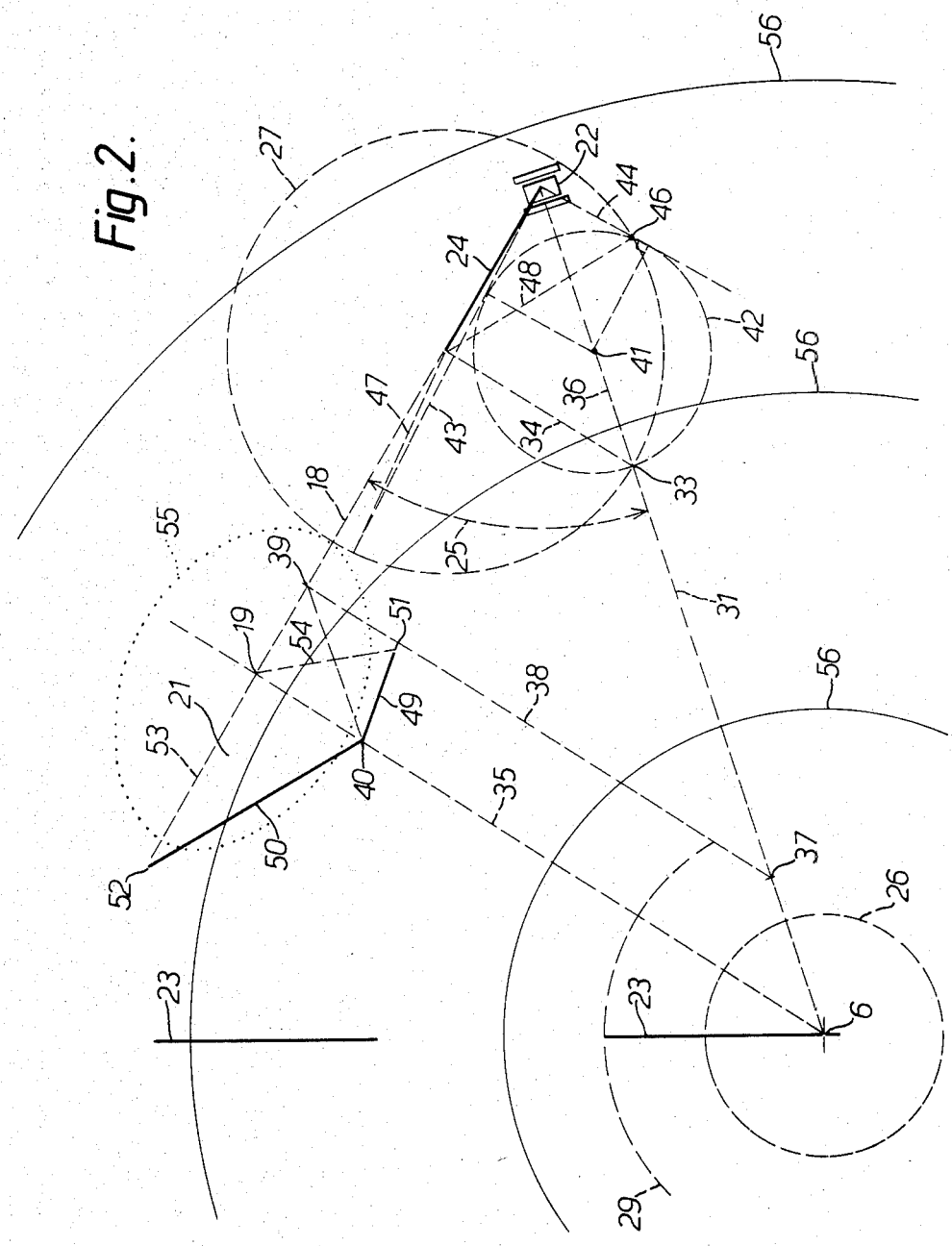
FIG. 2 is an explanatory diagram showing how a display of the apparatus is derived.

Turning now to FIG. 2, this is a diagram useful in explaining how the PAD area for each target vessel is produced in accordance with the concept of the present invention. FIG. 2 shows the geometric, and hence computational relationship, between own ship 6 and a vessel 22 (termed the target) in an encounter situation. FIG. 2 represents a conventional radar PPI display with own ship 6 located at the display center and center of the coordinate reference system. The presentation mode is Relative Motion stabilized with own ship heading at the moment of initiation in the upright or top dead center position of the display. Own ship present heading, which may differ from the heading at initiation, is represented by a heading marker which is subdivided into alternate displayed and blanked 6-minute segments 23, as is conventional, based on data provided by the speed log.

The first brightened heading marker segment 23 with origin at own ship 6 represents the radius of own ship 6-minute speed circle 29. For the purpose of the PPI display shown, own ship has a speed of 17.5 knots and its present heading is undefined in absolute terms. Range rings 56 are shown at 2 nautical mile intervals.

The target vessel 22 is located at the 2 o'clock position relative to own ship 6 and is defined by a 6-minute vector 24 indicating the true motion progress of the target 22 in the same manner that the first segment of the heading marker 23 represents own ship true motion progress after six minutes of time. The system operator will have selected the appropriate own ship heading and speed inputs to establish own ship true motion parameters, and the exact nature of the target true motion display output will reflect this choice. For the purposes of the present description, own ship gyro heading and single axis speed through the water are selected as system inputs as already described. The parameters of the target 22 represent target heading steered and its fore-and-aft speed through the water, assuming an homogeneous water mass. In this way, the aspect angle 25 of the target corresponds closely to the value which would be observed visually in a real encounter.

Having selected a minimum safe distance of separation (typically one nautical mile) in respect to the target vessel, the analysis proceeds as follows. A closest point of approach (CPA) circle 26 is inscribed about own ship 6 using the selected safe distance as the radius.

A circle 27 of radius equivalent to 6 minutes of own ship motion, i.e. own ship velocity divided by ten, is inscribed about the end of the target 6-minute vector 24. This circle 27 may or may not intersect a line 31 joining the target 22 and own ship 6, the line 31 representing the line of bearing to the target 22 and the collision path, i.e. the path that the target relative motion vector would follow if the target 22 were on a collision heading with own ship 6. For the purposes of the present description, the radius of the circle 27 has sufficient magnitude to intersect the line 31 at 33. If the target 22 is faster than own ship 6, the line 31 will be intersected in two places between the target 22 and own ship 6. The point of intersection 33 is connected by a radial line 34 to the center of the circle 27.

The line 34 thus generated represents own ship true vector which, in conjunction with the target true vector, will result in a relative track which will cause the target to collide with own ship (line 31). Having identified an own ship heading which results in a zero target separation distance for own ship present, or any other trial, speed, based on the relative position and true motion of the target vessel 22, it is possible to lay off this own ship heading from own ship position 6 as represented by line 35 extended to intersect a projection of the target true track 18 at the PPC 19. In the circumstances of zero or near-zero target aspect angle, the location of the PPC 19 on the target trackline 18 can be established by using the ratio of the speeds of own ship and the target.

The own ship vector 34 and the target vector 24 have with them a 6-minute relative velocity vector 36 of the target motion which permits calculation of the time interval for the target 22 to arrive at the PPI center if own ship adopts the heading 35. The time interval thus derived by relative motion analysis can be observed directly at the PPI by placing the bearing cursor through the PPC 19 position and counting the 6 minute time segments between the PPI center 6 and the PPC 19.

The category of the target vessel 22 in FIG. 2 is that it is slower than own ship 6 (but its speed is greater than ⅛ of own ship speed), and its aspect angle is less than 90°. Accordingly, the final escape point (FEP) rule is the one given by the relationship:

Range (FEP) = 1.5 times the preselected CPA distance of one nautical mile.

This enables the location of the target 22 on its collision track 31 to be identified for the moment of FEP at position 37.

The following construction may be used to identify the location of own ship 6 along the direction of the heading 35 towards the PPC 19 when the FEP is reached. A line 38 is drawn from the point 37, parallel to the line 35, to a point of intersection 39 with the track 18 of the target 22. A second line is drawn from the point 39, parallel to the line 31, to a point of intersection 40 with the line 35, which point of intersection is the final escape point (FEP) 40 for own ship 6.

If own ship 6 adopts the heading 35 (the heading directed towards the PPC 19), observed bearing to the target 22 will remain fixed as its range from the target diminishes in obedience to the fundamental laws of relative motion, so that when own ship arrives at the FEP 40, the target will be seen at point 39 and the separation range at that moment will be 1.5 nautical miles.

Own ship operator is thus presented with two distinct sets of information: he sees the time interval and heading of own ship at present, or at a specifically selected own ship trial speed, to reach the FEP, together with the additional time necessary to arrive at the PPC on the same heading. The operator thus has an indication of the time interval to each of these two events, as represented by the 6-minute elements on the heading marker 23, repeated also on a variable bearing cursor not shown in FIG. 2.

The derivation of the length and direction of own ship vectors which must be adopted when own ship reaches the FEP 40 to achieve the preselected CPA distance with the target 22 will now be described. A point 41 on the bearing line 31 is the same distance from the target 22 as the point 37, the location of the target 22 at the moment of FEP in the relative motion frame of reference, is from the PPI center 6. If the target is considered fixed at position 22, then point 41 is the position occupied by own ship 6 at the moment of FEP. A relocated speed circle 42, the radius of which is equivalent to the radius of own ship CPA circle 26, is drawn with point 51 as the center. In keeping with a beneficial feature of the prior art, the radius of the visualized relocated CPA circle 42 may be increased by a pre-selected margin of safety factor of 1.1 times, for example which will have the effect of enlarging the area of the PAD area which will be computed subsequently. Tangents 43 and 44 are drawn from the target 22 to the relocated CPA circle 42 the tangents representing the relative tracks the target must follow to achieve the preselected CPA distance (the radius of the CPA circle), assuming the relative positions of own ship 6 and the target 22, are represented by the respective extremities of the vector extending from the target 22 to the point 41.

The heading of own ship 6 at the FEP 40 to create the relative tracks 43, 44 are represented by the vectors 47 and 48, respectively. The derivation of the vectors 47 and 48 and the determination of the time interval on each to achieve the desired CPA distance follows from established plotting procedures. The vectors 47 and 48 can be laid off from the FEP 40 to form line segments 49 and 50 which constitute the periphery of the PAD symbol 21 closest to own ship 6. The respective ends 51 and 52 of the vectors 49 and 50 represent the location of own ship 6 after having moved to the FEP 40, and then adopting the recommended headings represented by the vectors 49 and 50, at the moment that CPA will occur.

The point 52 represents the CPA with the target 22 passing astern of own ship 6, and point 51 the CPA with the target clearing ahead of own ship.

The four points 19, 40, 51 and 52 now defined in respect of the future motion of the target 22 and own ship 6 are used to define a predicted area of danger (PAD) area 21 into which own ship must avoid intruding to maintain a preselected value of CPA distance. The three points 51, 40 and 52 are connected by the two lines 49 and 50.

The PAD symbol 21 is completed by a line 53 linking the astern CPA position 52 to the PPC 19, and a line 54 joining the ahead CPA position 51 to the PPC 19, the PAD area being linked to the target 22 by extending the target's track 18 to the PPC 19. The symbol so located on the PPI represents an area in the water mass which is deemed to be hazardous in that an attempted transit by own ship will coincide with the target's transit of the same region, giving rise to inadequate final separation and the possibility of actual collision.

In general, target encounters will produce a variety of different initial situations. Targets may occupy any position relative to own ship, may head in any direction, may be faster, slower or the same speed with respect to own ship, or may be stopped in the water, when they exhibit a vector 24 of zero length.

Frequently terrestrial echoes, such as from navigation marks or beacons, rocks or small islands and from terrestrial linked objects such as buoys and light vessels, are acquired as targets either inadvertently, or intentionally when they are required to provide information of navigational significance, such as the heading to steer (HSTR) to achieve a preselected CPA distance, when they will display a vector which is the negative of the tidal and disturbance vector. These variations will be reflected exactly in variations in the location, disposition and outline of the associated PAD area. In the case of a faster target, there may be a second PAD area within radar range or there may be no PAD area, in which case only the target 6-minute vector will be displayed. A slower target will always have a single PAD area, but it may be outside radar display range, in which case again only a 6-minute vector will be displayed.

FIG. 2 also shows an elliptical PAD area 55 generated in accordance with the inventive concept of U.S. Pat. No. 3,725,918 to illustrate the differences between this piece of prior art and the present invention: it will be seen that the PAD area 21 of the present invention occupies a smaller region than the elliptical PAD area 55 and eliminates the region on the far side of the target trackline 18 which helps considerably in producing a relative uncluttered display. The PAD area created by the present invention provides, in addition, an extension "in front of" the elliptical PAD area 55, thus establishing greater margins of safety in the case of the more critical type of clearing maneuver.

Furthermore, it is well established in the art of collision avoidance aids using the PAD convention that faster targets possess two PAD areas and two distinct PPCs in the early stages of an encounter. These two PAD areas, which may be termed primary (the one closest to the target) and dual, eventually merge together, then representing a stage in a clearing encounter when it is no longer possible for own ship to cross the bows of the target with the required CPA distance. Subsequent to the merging of the primary and dual PAD areas the two PPC's merge and then disappear, representing a further stage in the clearing encounter when it is not possible for own ship to adopt a heading that will result in a collision but when headings still exist which will result in CPA distance less than the preselected value. Finally, the single (merged) PAD area disappears leaving the target showing a six minute vector only and thus representing a non-hazardous situation.

FIG. 3 is an enlarged view of the display 7 of FIG. 1 but showing a plurality of acquired targets. The position of own ship 6 is represented by a synthetic cross which, as already explained, is offset from the center of the display. The PPI display 7 is in a relative motion format by which is meant that own ship remains permanently fixed at the location 6, and the movement of the echoes of targets such as 58, 66 and 68 obey the laws of relative motion. Furthermore, the PPI display 7 is always stabilized in azimuth such that the only display element which moves when own ship alters its heading is the heading marker 23. On the other hand, the triad of information provided by the relative locations of the target, its PAD area and own ship provides data at the moment of observation in a virtual true motion format without the necessity to move the PPI center spot. Hence, radar echoes will progress in time with velocity vectors which are the combination of the target velocity vector, if it exists, with the reverse or negative of own ship velocity vector. Echoes of stationary targets, whether other vessels at anchor, buoys or land masses will move across the display in the opposite direction to own ship progress and with a speed equivalent to own ship speed but moderated by the prevailing conditions of external disturbances, such as the tidal flow and weather effects. Targets in motion, representing traffic within radar display range, generating video responses which are created on the display, will move in a complex manner described by the following vectorial equation:

$$\vec{V}_{R(\delta t)} = \vec{V}_{T(\delta t)} + (-\vec{V}_{O(\delta t)})$$

where:
$\vec{V}_R$ is a vector representing the magnitude and direction of a target's relative velocity over some finite observation or plotting interval, $\delta t$.
$\vec{V}_T$ is a vector representing the true or absolute magnitude and direction of the target's motion in the same interval, $\delta t$.
$-\vec{V}_O$ is the reversed or negative value of own ship's motion in the interval $\delta t$.

Conventional radar plot extraction is concerned with observing $\vec{V}_R$ to obtain a direct and convenient assessment of the hazard generated by a radar target and extracting $\vec{V}_T$ to provide supplementary data, particularly data associated with planning maneuvers. Where a hazard is identified as real, by which is meant that $\vec{V}_R$ is directed towards own ship position 6, the influences of variation in $\vec{V}_O$ on $\vec{V}_R$, assuming $\vec{V}_T$ remains fixed, have to be investigated. The present invention is concerned with performing this analysis and exhibiting the resultant intelligence in an advanced and ergonomically sound manner by way of a PAD area associated, where appropriate, with each target. In particular, the PAD symbol is displaced in association with the true vector of the target and relative vectors are not shown directly. Relative motion data, however, is represented inhererently by the PAD symbol. Whenever computed CPA distance is less than the preselected criterion, the PAD area generated inevitably must intersect the heading marker by virtue of the manner in which the PAD area is constructed. In a similar fashion, the transverse distance between the heading marker and the PPC provides an indication of present CPA distance to an acceptable level of accuracy in the cases of PAD areas close to the heading marker.

As already stated, a heading marker 23 is generated for own ship 6 based on data provided by the gyrocompass 15 and the speed log 16. The value of own ship heading is further indicated by means of a 3-digit digital indicator (not shown) located above the display 7. Own ship present speed is indicated similarly by an indicator (also not shown) with 3 digits reading to one decimal place. For the purposes of FIG. 3, own ship 6 is provided with a heading of 325° and the speed input from the speed log 16 is assumed to be 15.0 knots. Range rings 56 concentric with the position of own ship 6 are inscribed at intervals of 2 nautical miles. The operator has control of the direction of an electronic bearing cursor 70 which is shown by a broken line sub-divided into alternate brightened and blanked 6-minute vectors as in the heading marker 23. The direction of the electronic bearing cursor 57 is indicated by a separate dedicated 3-digit readout (not shown).

FIG. 3 shows a variety of acquired targets posing different degrees of collision hazard in respect to present action and possible future maneuvers of own ship 6. For the purposes of this illustration, it is assumed that own ship is approaching a stream of traffic moving in a traffic separation zone with the intention of crossing the zone.

FIG. 3 depicts the relative motion PPI 7, with own ship's position at point 6 and own ship's present heading representged by the segment heading marker 23. The PPI is in the Head-up mode of presentation, with the center spot 6 off-set 50% of the radius astern of the geometrical center.

A variety of targets is illustrated; a target 58 has a short 6-minute vector 59, suggesting that its speed through the water is low and it will be assumed that this target is a light vessel. The broken track line 60 is extended to a PPC 61. The PAD area 62 associated with the target 58 is composed of an FEP 63 and two CPA positions 64, 65. A further target 66 having a PAD area 67 suggests a target of much the same category as target 58 and will be assumed to be a ship at anchor. Another target 68, at a distance of 7 miles on the port bow of own ship 6 is showing a fine red sidelight and its PAD area 69 represents little hazard for own ship on its present heading.

The navigational situation facing own ship 6 is that an alteration of heading of 65 degrees to starboard must be undertaken when it is safe and convenient to do so. Accordingly, the bearing cursor 70, segmented in 6-minute steps like the heading marker 23, is laid off in the appropriate direction to represent the "new" heading. It is now necessary to evaluate the distribution of PAD areas on the starboard bow and the motions of the targets creating them. Four targets 71, 72, 73 and 74 are all moving in a general direction from port to starboard with respect to present heading and represent a stream of traffic in the traffic separation zone. These four targets have respective PAD areas 71', 72', 73' and 74' associated with them. There are two other targets 75 and 76 which are engaged in crossing the traffic separation zone at this moment. The target 75 is heading away from own ship 6 and has a vector 77 without a PAD area which means that it is either a faster target receding from own ship (and therefore has no PAD area), or it is a slower target whose PAD area is beyond the range of the display 7. In either case, it is classified as non-hazardous. The target 76 has a PAD area 76'.

The task facing own ship 6 is to decide when it is optimum to make the required heading alteration without moving towards any of the PAD areas 71', 72', 73', 74' and 76'. The tactical decision can be posed as a two-level question: is it safe to make the alteration now; if not, when will it be safe? An alteration to the new heading represented by the cursor 70 would necessitate a further alteration within 7 minutes having regard to the PAD area 73'. Furthermore, if this maneuver is conducted, the target 73 will be replaced under extreme pressure by virtue of own ship presenting it with an unacceptable CPA distance. Hence, it is not prudent to come around to starboard at this time. In six minutes time, own ship 6 can be visualized as occupying a position at the tip of the first segment of the heading marker 23. Similarly, the targets 73 and 74 will be at the tips of their respective 6-minute vectors. The PAD areas 73' and 74' can be assumed to occupy a fixed position. This form of reversed prediction is an established characteristic of the PAD display techniques.

If the bearing cursor 70 is visualized as being moved parallel to its present direction until its origin 6 is at the tip of the first vector segment 23, the line of progress of own ship on the "new" heading if the alteration is made in six minutes time can be judged. It is assumed that it is judged to be safe and prudent to conduct the maneuver in six minutes time. Considering the location of the PAD area 76' and the possibility of the target 76 associated therewith maneuvering to port, it may be decided to make the alteration of heading in four minutes time. The PAD areas 71' and 72' will produce no material problems on this new heading. If it were decided to stand-on because of the presence of PAD area 76', then eighteen minutes must elapse before the heading change can be conducted, so as to pass behind the PADs 71' and 72'. A prediction over such a long scale as eighteen minutes is likely to be questionable in any case, as new targets are likely to appear up ahead, which may produce new problems.

The traffic situation depicted in FIG. 3 is typical of the target densities and tactical decisions that have to be made minute by minute by ferries, for example, operating in the Dover Straits and other traffic separation schemes worldwide.

FIG. 3 illustrates very clearly that each target has a unique PAD area and that it is considered preferable to define the same as accurately as possible by emphasizing the locations of the PPC and FEP and the two limiting or ultimate vectors for own ship to maintain the preselected CPA distance rather than relying on circles and ellipses as in the prior art. It will be appreciated that the area and the relative position of a given PAD area identifies a hazardous region in that at all times in which own ship is heading towards it, the present CPA distance is less than the desired CPA, and that if own ship intrudes into it, it may no longer be possible to maneuver to achieve the desired CPA distance. The relative locations of the PAD symbols, therefore, provide hazard information at two distinct levels: if the PAD symbol lies on or close to own ship's heading marker 23, the self-imposed CPA criterion is being breached and the target vessel will identify own ship as posing a threat to it; the location of the FEP and the two vectors emanating from it, which form the nearside periphery of the PAD area, identifies the time interval available in which own ship must plan its evasive maneuver, subject always to the dictates of the Collision Regulations.

The display 7 is continually updated in this respect, whereby the operator of own ship 6 has displayed to him at a given instant the current situation and the future situation and can tell at a glance whether a target represents an increasing or decreasing hazard which means that confirmation, or otherwise, that an own ship maneuver will be effective is forthcoming from the actual display 7 which is a significant advance in the art.

This feature of the collision avoidance apparatus of analyzing a collision encounter in a dynamic sense will be described more fully with reference to FIGS. 4 to 12.

Figure 4:
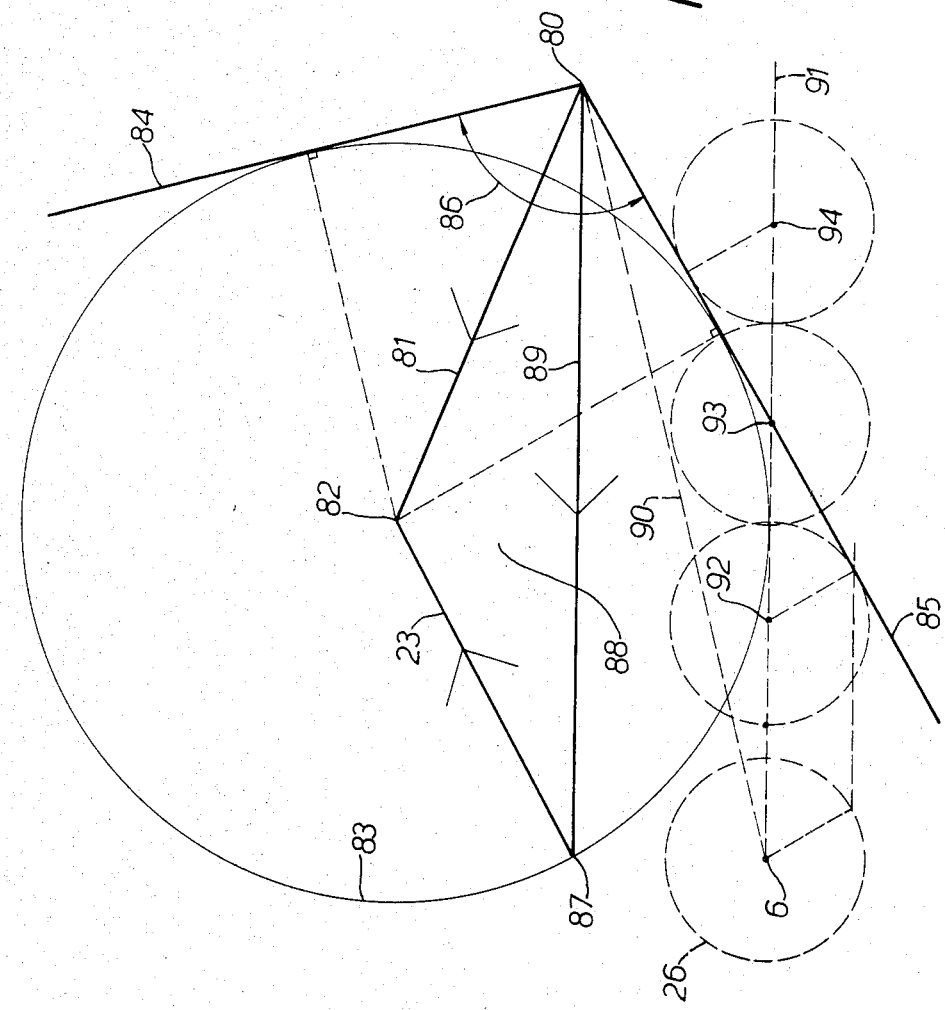

For the purposes of analysis of a collision encounter with one vessel, a generalized encounter diagram in a relative motion format is established, as in FIG. 4. A true velocity vector 81 of a target 80 is drawn for a suitable plotting interval of, say, 6 minutes. An own ship speed circle 83 with center at point 82, the tip of the target's vector 81, the radius of which is equivalent to own ship's distance of travel in 6 minutes, is completed. It will be seen that in the case selected, the target is faster than own ship. This specific speed ratio relationship has been selected deliberately to enable the more complex situations which arise in such an encounter to be explored. Tangents 84, 85 to the speed circle 83 from the target location 80 are drawn, these tangents representing the boundaries of a critical sector 86 in respedct to the target 80. If the position of own ship 6 and its CPA circle 26 relative to the target 80 lies within the sector 86, then the target 80 will be seen to be hazardous and will develop one or possibly two PAD symbols when processed. Conversely, if own ship 6 and its CPA circle 26 lies outside the critical sector 86, the target will be declared non-hazardous and a PAD symbol will not exist.

Own ship's vector 23 is laid down so that its tip coincides with the tip 82 of the target's vector 81. A line from the target 80 to the origin 86 of own ship vector 23 completes the 6 minute triangle of velocities 88. A vector 89 represents the 6-minute relative vector of the target 80, its length representing 6 minutes of relative speed.

Own ship's position 6 and its CPA circle 26 relative to the target 80 is established so that it lies within the critical sector 86. The present line of bearing between own ship and the target is represented by a line 90.

For the purposes of the generalized encounter diagram, it is convenient to visualize the target 80 remaining fixed and own ship 6 moving with the negative 91 of the relative track 89.

Three significant events which will occur in the subsequent encounter can now be identified:

(1) when own ship 6 reaches position 92, the CPA circle 26 will be tangential to the boundary line 85, representing a situation after which it will no longer be possible for own ship to pass clear in front of the target 80 while maintaining the desired CPA distance.

(2) when position 93 is passed, it is no longer possible for own ship 6 at present speed to adopt any heading that could result in collision with the target 80.

(3) when position 94 is passed, it is no longer possible for own ship 6 to adopt a heading that would result in own ship breaching the the CPA criterion, a stage in the encounter in which the target will be declared non-hazardous and will be displayed by means of a 6-minute vector only, without a PAD area.

Figure 5:
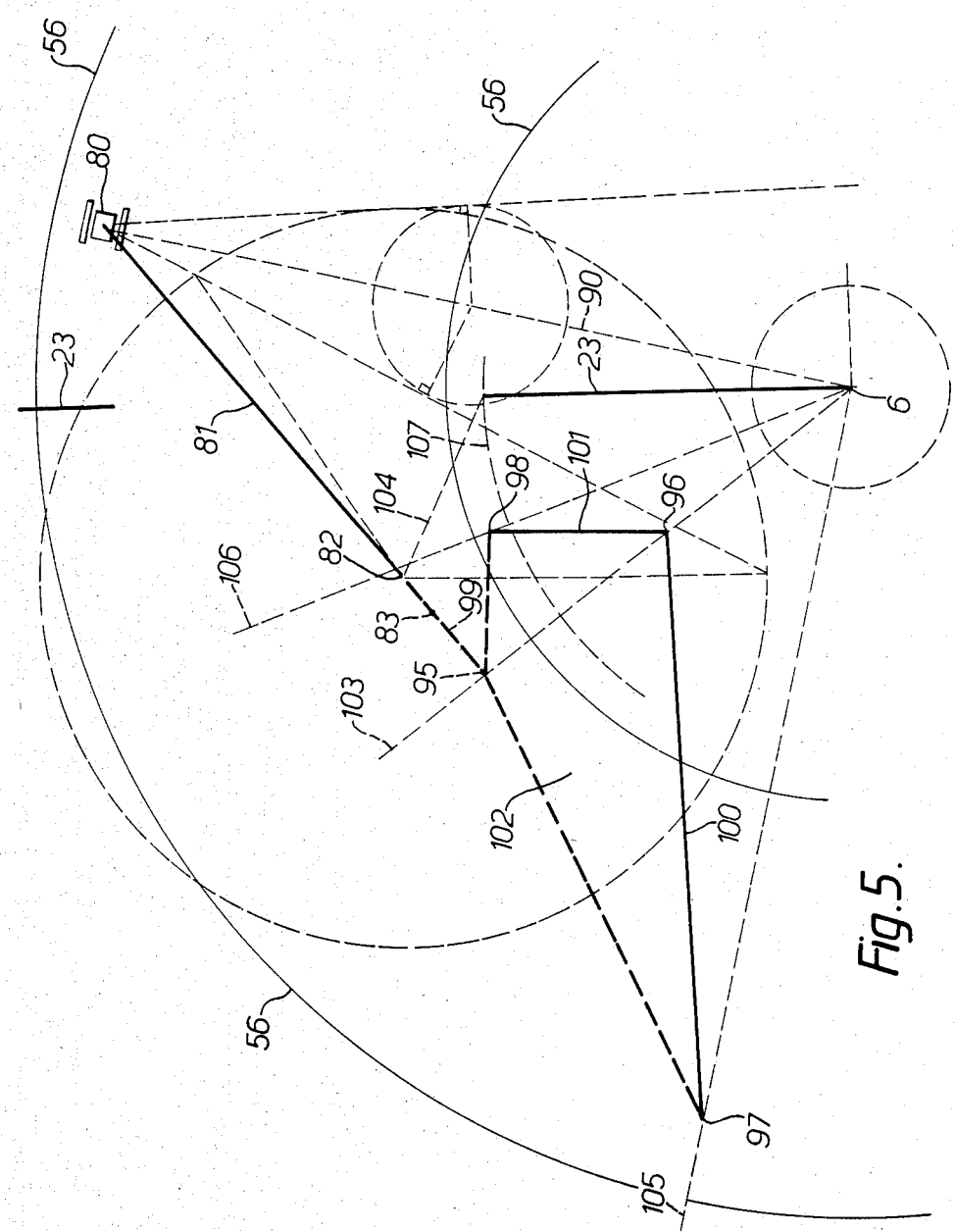

Four stages in the encounter with the faster target 80 will be investigated with reference to FIGS. 5 to 9 inclusive. FIG. 5 represents the stabilized relative motion PPI of the display 7 of the present apparatus, in the head-up mode of presentation. Own ship's present motion is represented by the heading marker segments 23 as before. The present line of bearing to the target 80 is represented by the broken line 90. The target's true vector 81 is terminated at 82 also as before. The computed location of a PPC 95 is connected to the tip 82 of the target's vector 81 by a broken track line 99. The FEP 96, which lies in the same line of bearing 103 as the PPC 95, together with the vectors 100, 101, form the nearside periphery of a PAD area 102 for the target 80. The tips 97, 98 of the respective vectors 100, 101 are the locations of own ship 6 at which CPA for target 80 would occur if own ship travelled to the FEP 96 and then adopted the indicated headings from 96 towards 97, or from 96 towards 98, respectively.

Own ship 6 can be maneuvered in a variety of ways with respect to the PAD area 102 of target 80. It can adopt a heading 103 directed towards the PPC 95 for a time interval represented by the distance from 6 to the FEP 96, which approximates to some 4 minutes steaming. On arrival at the FEP 96, two headings 100 and 101 are available which will maintain the desired CPA distance of one nautical mile. The heading represented by the vector 101 will establish the CPA when own ship 6 reaches position 98, approximately 2 minutes later. The location of the target 80 at the moment of CPA with own ship 6 at position 98 is represented approximately by the position 83. The CPA position 98 results with the target passing clear ahead of own ship 6, with the bearing opening in an anticlockwise direction.

If own ship 6 approaches the FEP 96 and adopts the heading represented by the direction of the vector 100, the CPA will occur when own ship reaches the CPA position 97. In this case, the target 80 will pass clear astern of own ship with the bearing opening in a clockwise sense.

As the PAD area 102 is clear of the heading marker 23, if own ship 6 stands on in the encounter, the CPA which will result will be greater than the desired CPA. The target will be right ahead of own ship in 3 minutes; in 6 minutes the relative location of the target 80 will be represented by the broken line 104 connecting the tip of the first heading marker 6-minute segment 23 and the tip 82 of the target's vector 81.

Two other significant headings of own ship 6 can be considered: these are headings 105 through the CPA position 97, and 106 through the CPA positions 98. These headings 105, 106 are the headings which are tangential to the extremities of the PAD 102 and which are headings of significance in the prior art. The significance of the CPA positions 97, 98 are based on own ship 6 travelling to the FEP 96 and then adopting either of the headings 100, 101. If own ship 6 heads directly to the CPA points 97, 98, the significant effect is that own ship will arrive at either position earlier. In the case of heading 105, the actual CPA position will occur later and will be in excess of the desired value. The increased margin of safety created is considered beneficial, as the maneuver to cross ahead of targets is known to be an option with higher attendant risk.

Adopting the heading 106 will result in a lesser CPA, which will occur later than position 98. An arc 107 of a circle centered at 6 and having a radius equivalent to the length of the vector 23 will establish the location of own ship 6 on the heading 106 after 6 minutes, when the target 80 will be located at position 82. Hence, the target 80 will have crossed ahead of own ship 6 on its heading of 106. In crossing encounters of this category, in which own ship 6 is maneuvered to pass behind the primary PAD area 102 of the target 80, and hence behind the target, the degree of hazard diminishes rapidly once the target has crossed ahead of own ship and it may not be necessary to hold the evasive maneuver until the CPA position is reached, as is common practice in clear weather.

The scale used in FIG. 5 is established by the range rings 56 which represent range intervals of 2 nautical miles.

Figure 6:
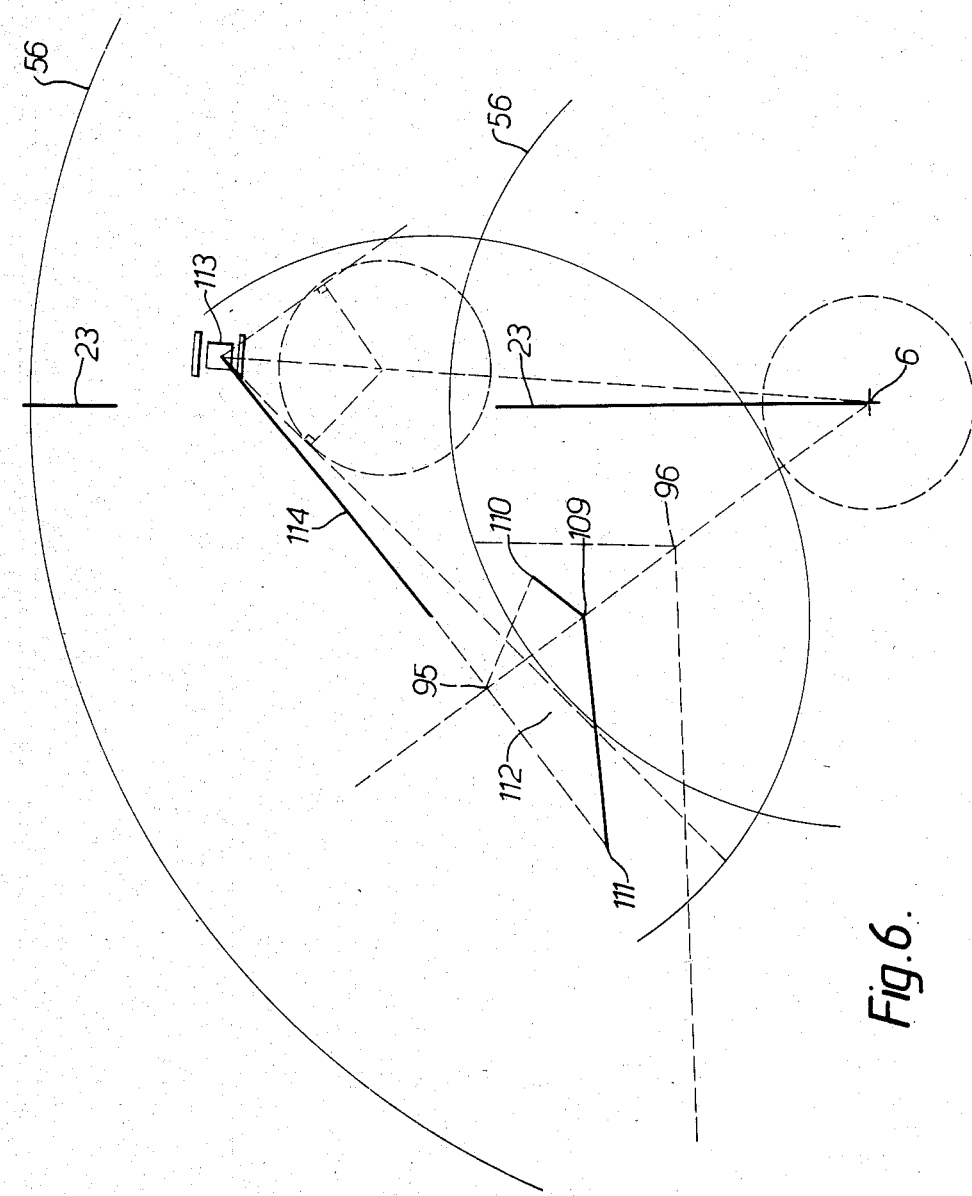

FIG. 6 illustrates a PAD area 112 created by a target 113, the 6-minute vector 114 of which is less than the heading marker segment 23, but whose PPC 95 is in the same position relative to own ship 6 as in the case illustrated in FIG. 5. The FEP of the PAD area 112 is located at 109; the two CPA positions are located at 110 and 111, respectively. Two range rings at 2 nautical mile intervals are shown as circles 56. For the purposes of comparison, the nearside escape vectors of FIG. 5 are redrawn in FIG. 6, from their appropriate FEP 96. It will be seen that own ship 6 is permitted to approach the PPC 95, under the FEP rules, much closer when the target 113 has a speed which is less than the speed of own ship, and that the time interval to CPA from the FEP 109, particularly in the case of the CPA position 111, is much less than that illustrated in FIG. 5. The result of the FEP rules is that faster targets are, of necessity, given a wider berth than slower ones, an accomplishment of the present invention that is in keeping with the intentions of the International Regulations for the Prevention of Collision and the ordinary practice of seamen.

Figure 7:
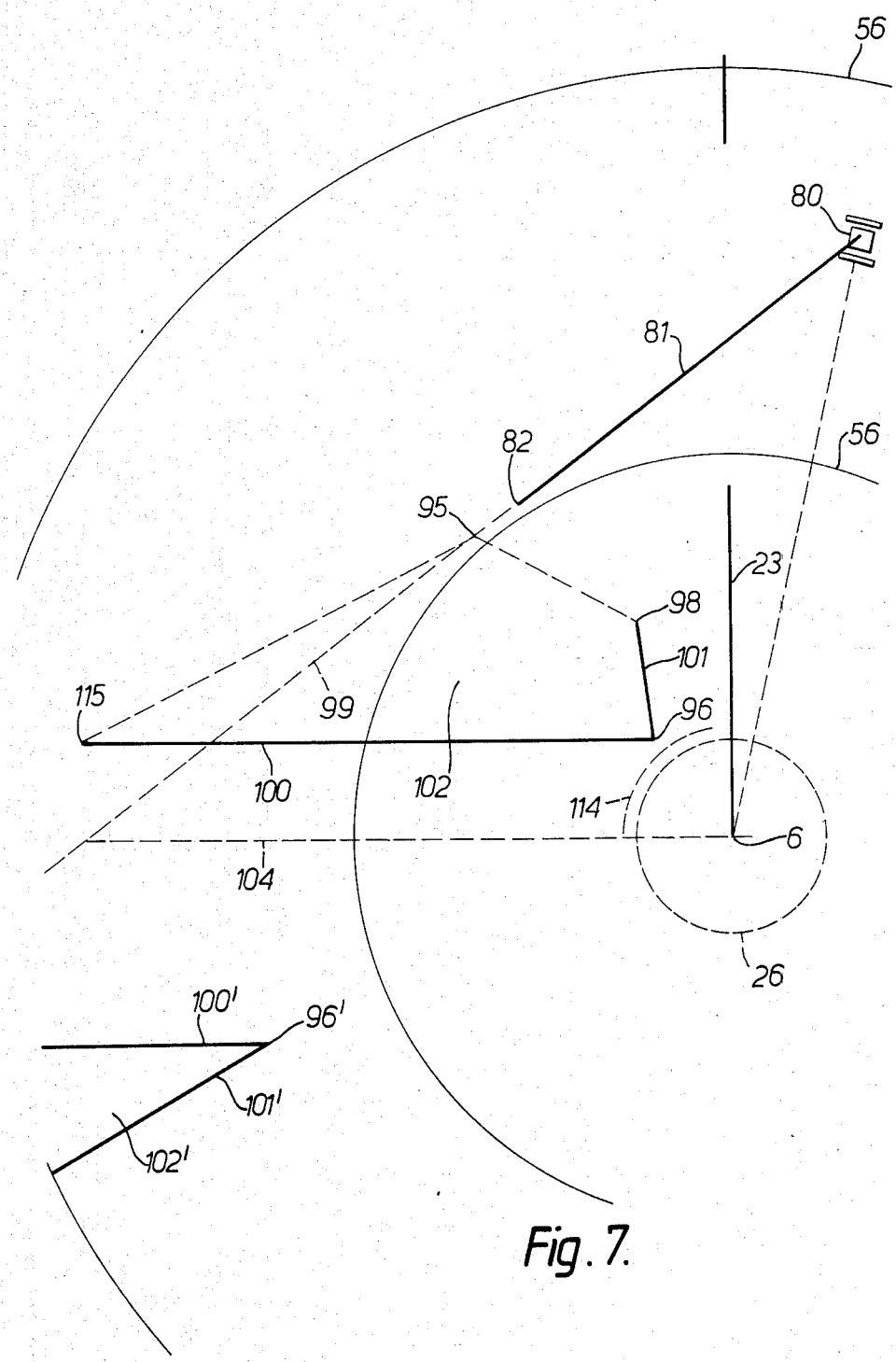

FIG. 7 represents a stage 1.1 minutes later in the encounter with the target 80 of FIG. 5, when own ship 6 is approximately half the distance between points 6 and 92 in FIG. 4. The PAD area 102 is derived in exactly the same manner as before. It will be seen, however, that the FEP 96 is much closer to own ship 6 than before and the vector 101 has rotated in an anti-clockwise sense and shortened; a self-evident result when the dynamics of the encounter are considered. The position of the ahead CPA point 98 has changed likewise in response to the dynamic changes which have occurred. The greater element of significance is the appearance within the range scale of the display of part of a second PAD area 102' which approaches own ship 6 rapidly as time elapses. The PAD area 102' is the dual PAD area and is a mirror image of the first or primary PAD area 102. The dual PAD area 102' possesses a dual FEP 96', and dual escape vectors 100', 101'.

The situation illustrated in FIG. 7 represents a moment in the encounter with the target 80 when it is still just possible for own ship 6 to adopt a heading such as 104 and cross the bow of the target 80 with adequate CPA distance. In practice, at such a late stage in an encounter, it would be unwise to comtemplate such a maneuver, knowing that the change of heading of own ship to take it into the region between the peripheries 100 and 100' of PAD area 102 and 102', respectively, would result in a significant drop in own ship speed which will have the effect of closing the gap between the PAD areas 102 and 102'. The existence of the dual PAD area 102' for the faster target 80 is known from the prior art and is now an established phenomenon in collision avoidance procedures.

It will be noticed that the FEP 96 is close to meeting the circumference of a circle 114, the radius of which represents 1.1 times the radius of the CPA circle 26. When tangency with periphery 114 occurs, a check will be conducted to determine if own ship's heading as represented by the first segment 23 of the heading marker is directed between the vectors 100 and 100'. In the case illustrated in FIG. 7, own ship is not exercising the option to pass in front of the target and the computation of the FEP 96 location will be changed from the conditions described earlier as Rule 1 to that of Rule 4.

Whenever the dual PAD area 102' is displayed during an encounter with the faster target 80, the broken line 99 extending from the tip 82 of the target's vector 81 to the PPC 95 is extended from the latter to its dual PPC (not shown).

Figure 8:
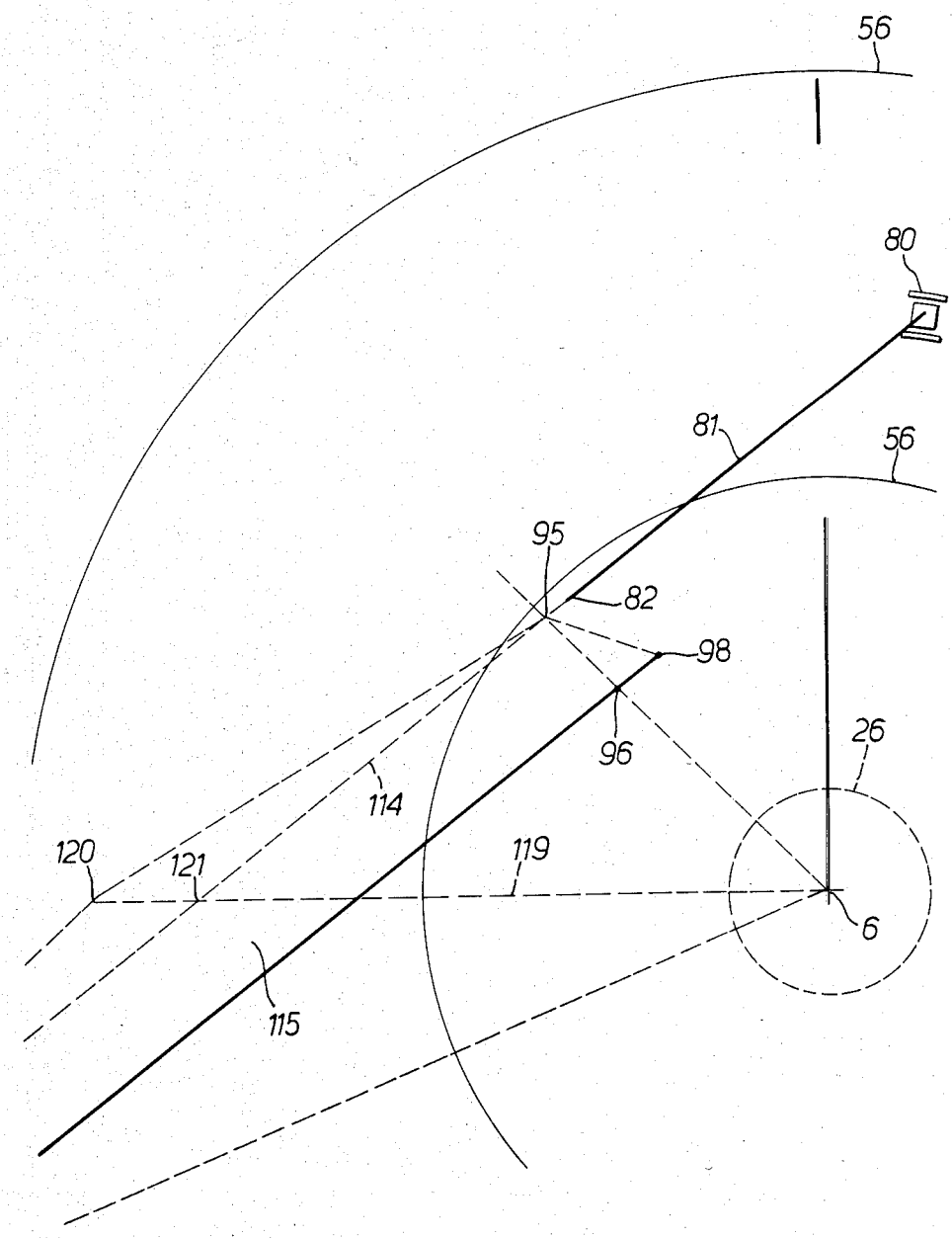

FIG. 8 represents the situation which will exist after a further 0.5 minutes of the encounter with the target 80. The PAD area 115 is a merged or occluded PAD (from PAD area 102 and 102') having two distinct PPCs, one at 95 and the other not shown.

PPC 95 has its FEP 96 associated with it in accordance with FEP Rule 4; similarly, the dual PPC is associated with a dual FEP (not shown).

As time elapses and the target 80 continues to clear away on the port bow, the PPC 95 and its dual 116 will tend to merge at the point of intersection of the lines 119 and 114. This moment represents the final moment when a heading is available to own ship 6 which could result in collision with the target 80.

Figure 9:
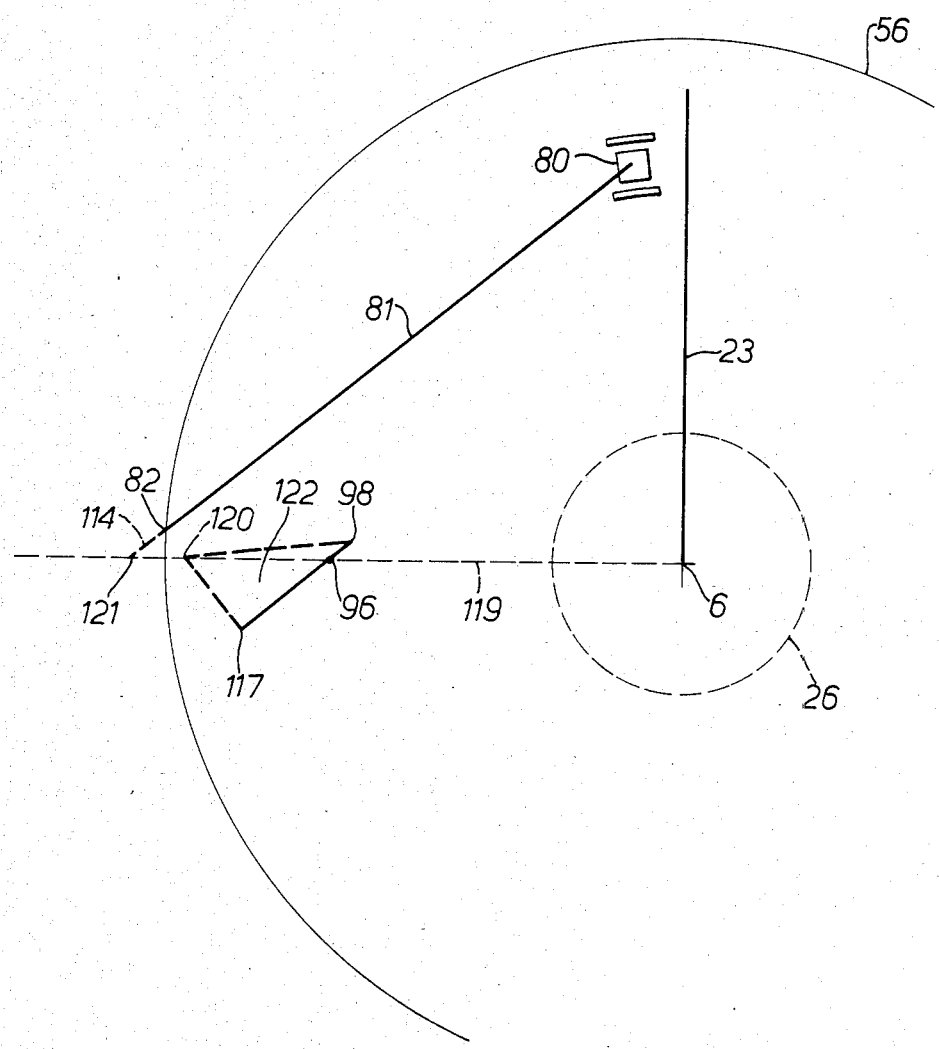

FIG. 9 depicts the situation prevailing one minute later in the encounter with the target 80. The two PPCs of FIG. 8 have merged at the intersection of the lines 114 and 119, when the point 120 was coincident with the line 114. Thereafter, the line 119 is terminated at its point of intersection with the line 114, becoming point 121 in FIG. 9.

The points 117, 120 and 98 in FIG. 9 are moving to coincide with the FEP 96 which is located on the minimum CPA heading 119 in the case of the non-PPC PAD area 122. The location of point 120, the far-side apex of the PAD area 122, provides an indication of the CPA which results if own ship 6 adopts the heading 119 and passes through the PAD area 122.

The PAD area 122 will collapse in one minute if own ship 6 maintains present speed and heading as represented by 23. The time interval between the merging of the dual and primary PAD areas, and the collapse of the occluded PAD area 122 for this particular encounter has been 3.7 minutes. In an encounter with a faster overtaking target, in which the relative velocity of the target would be less than in the case illustrated in FIGS. 4 to 9, inclusive, the time interval of the merging and collapsing sequence would be considerably longer.

Subsequent to the collapse of the occluded PAD area 122, the target 80 will display its true vector 81 alone. In these circumstances, the target is categorized as being non-hazardous, i.e. there is no heading available to own ship at present speed which will establish a CPA distance less than the desired value of CPA.

Attention is drawn to the significance of the furthermost apex of the PAD symbol as depicted in the sequence of FIGS. 7, 8 and 9. In FIG. 7, the tip 115 of the escape vector 101 represents the predicted location of own ship 6 at the moment CPA occurs. The location of the target 80 at this moment is represented by the intersection of the vector 100 with the target's trackline 99. Hence the segment of the vector 101—and correspondingly, the segment of the vector 100'—which lies between the target trackline 99 and the tip of either vector represents the direction and magnitude of the separation at the moment of CPA.

In FIG. 8, representing the symbology which is displayed after the duplex PAD areas have been merged, the segment of the vector 119 which lies on the far side of the target's trackline 114 represents the direction and length of the actual CPA that would occur if own ship 6 adopted an immediate heading in the direction of 119. The magnitude of the resultant CPA distance will be slightly greater than the pre-selected value of desired CPA, which follows from the procedure for occluding duplex PAD areas early unless own ship is committed to passing between them.

In FIG. 9, the PAD symbol, devoid of any PPC, lies entirely on own ship's side of the target's trackline 114. The segment of the vector 119 between the apex of the PAD area 122 and the intersection of the vector 119 with the trackline 114, the point 121, represents the minimum CPA value that would occur if own ship 6 adopted the heading 119 and steamed through the non-PPC PAD area 122. Own ship 6 would be located at position 120 in 7 minutes time and the target 80 would be located at position 121.

It will be seen, therefore, that the PAD symbol constructed in the manner indicated provides additional tactical information throughout encounters with faster targets that will be beneficial to practical Navigators.

The danger area approach based on the concept of the FEP will accommodate the extreme situation that will arise if own ship 6, for any reason, is forced to intrude into a PAD area. Intrusion into the PAD of a slower target, such as PAD area 21 of FIG. 2, on a heading other than a heading through the PPC 19 will cause the FEP to arrive at own ship's position at a late stage in the encounter. Thereafter, the PAD symbol, together with its escape vectors 49 and 50, will pivot about the combined own ship and FEP location on the side containing the PPC 19. As own ship 6 crosses the track of the target, a stage will be reached when the FEP will begin to recede from own ship's position.

While this maneuver is being executed, range will continue to diminish towards the minimum that is being accomplished, which will be less than the preselected CPA value but still larger than zero. When the range to the target is less than the pre-selected CPA value, the escape vectors will be computed on the basis of re-establishing a CPA value equivalent to the pre-selected value.

A situation may arise in practice in which own ship 6 is forced to maneuver towards the area in which an occluded PAD area, such as 115 in FIG. 8, exists. The apex 120 of the PAD area 115 represents the moment of CPA for own ship if heading 119 is adopted and the distance between the point 120 and 121, the intersection of the target's trackline 114 with the heading 119, represents the value of separation distance that will result. Note that the heading 119 may not achieve the required CPA distance for all occluded PAD areas but that it is well clear of the heading towards the PPC 95 (and its dual, not shown in FIG. 8.). The value of the final separation distance is indicated, however, in all circumstances.

When own ship 6 reaches th periphery of the PAD area 115 on the heading 119, the two escape vectors will rotate about own ship as it approaches point 121 on the target's track 114. At the precise moment that own ship 6 reaches point 121 and crosses the target's track 114, the two escape vectors will have closed together astern of own ship. If the calculated final separation distance for heading 119 is greater than the pre-selected value of CPA distance, two new escape vectors will appear, indicating that own ship now possesses some flexibility in its subsequent maneuver. If, on the other hand, the distance between points 120 and 121 was less than the selected CPA value, the PAD area would remain with a portion ahead of own ship until position 120 was reached, at which time the target would be declared non-hazardous and thereafter it would display a 6-minute vector only.

Whenever extreme maneuvers of the type described with respect to intruding into the single PAD area of a slower target or the occluded PAD area of a faster target, a high degree of operator alertness will be necessary. In particular, the manner in which the compass bearing of the target is changing will be monitored continuously.

Figure 10:
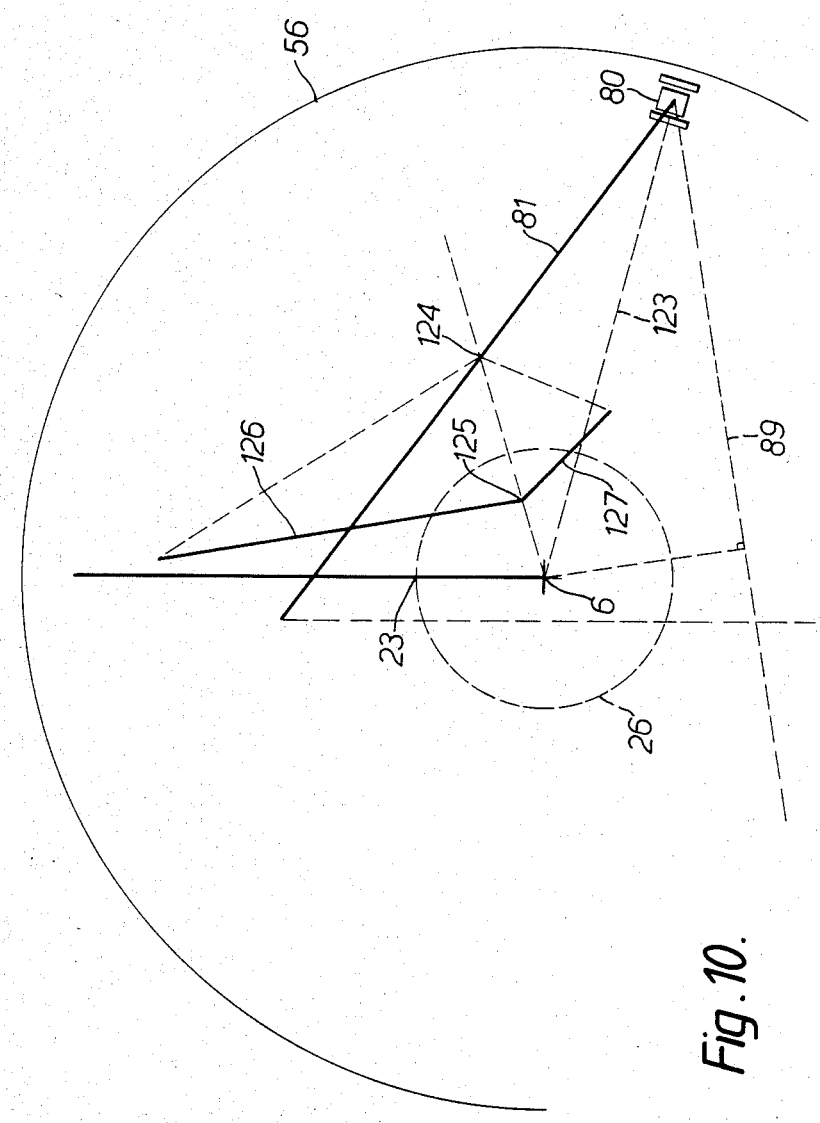

Referring now to FIG. 10, this represents the PPI display 7 six minutes later than the situation depicted in FIG. 5 assuming that own ship 6 adopted the heading 105 tangential to the PAD area 102, of the target 80. This represents a situation in which own ship has adopted the option to pass in front of the target 80. The present range and bearing of the target 80 relative to own ship 6 is represented by the line 123 and examining the 6-minute predicition provided by the tips of own ship and target vectors 23 and 81, respectively, the target will be right astern, just past its CPA position about five minutes later. The target 80 has a PPC 124 in this situation, an FEP 125, and two clearing headings represented by the vectors 126 and 127. The actual CPA which will be accomplished is in excess of the desired value (in fact the CPA is almost twice the desired value as seen by comparing the transverse distance between the heading marker 23 and the PPC 124, and the radius of the circle 26), giving an operationally advantageous margin of safety. The relative track for the encounter illustrated is shown by the broken line 89. This permits the actual CPA distance to be estimated. The tip of the vector 126 is clear of the heading marker 23, providing an additional confirmation of the larger CPA which exists. A two-mile range ring is shown at 56.

It will be clear to those skilled in the cathode ray display art that any of several well-known approaches may be used in tracing the various symbols on the screen of the cathode ray tube employed in the display 7. Type P scansion or raster scansion of the electron beam may be employed within the scope of the invention, each symbol being drawn by intensification of the electron beam as it is deflected across the locus of the symbol. The symbols may be drawn by well-known means during the fly-back or re-trace time between each such electron beam deflection, for example by one or by a series of deflections of the intensified beam during the fly-back time in a raster scanning system. Such methods are well-known in the art, as also are methods in which the regular polar or raster scanning of the intensified electron beam is now used. In such apparatus, symbols are generated by forming a programmed series of deflection strokes to form a symbol.

Figure 11:
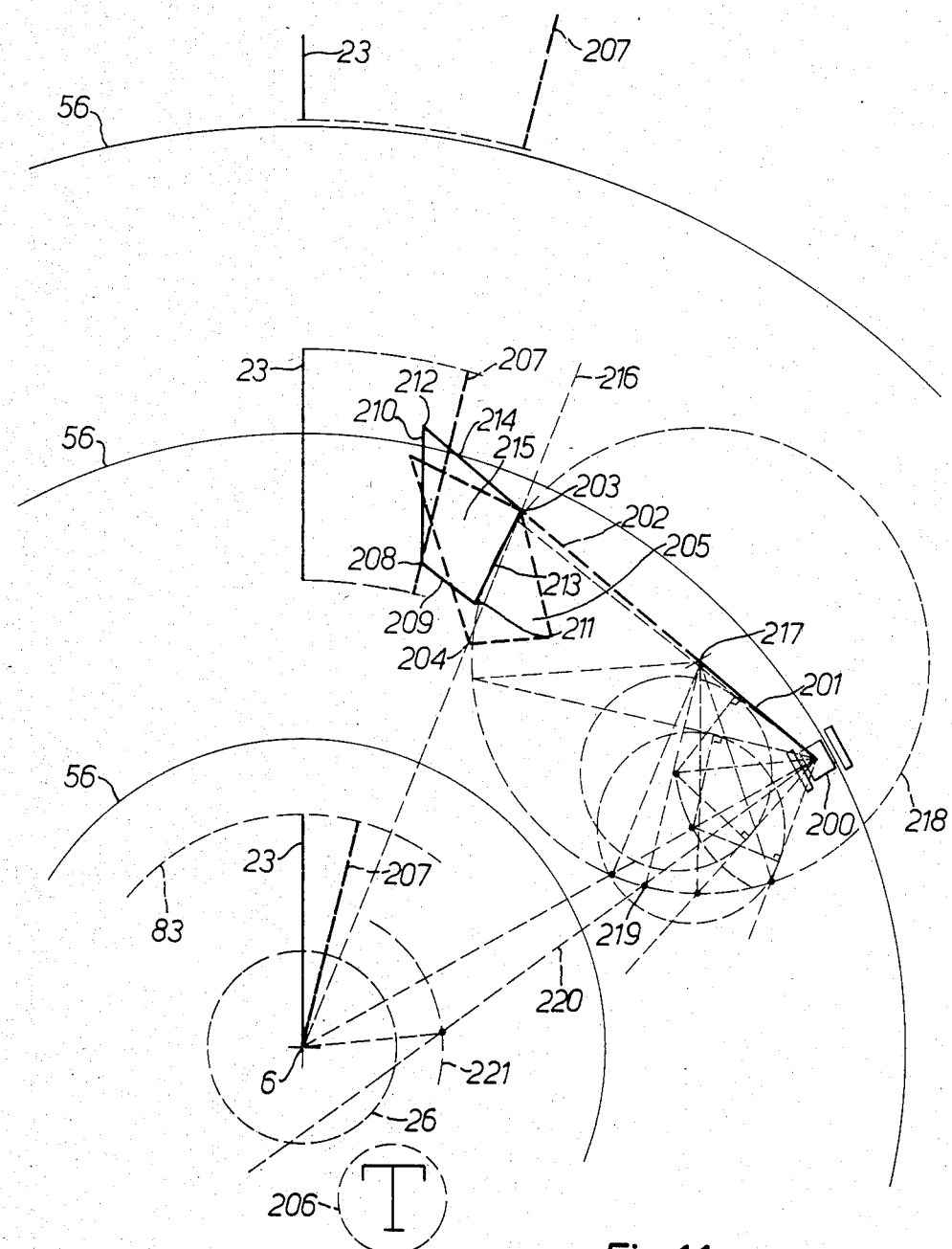

FIG. 11 represents the PPI display format in the Electronics Bearing Cursor Prediction mode of the apparatus. A target 200, which is in track, has developed a vector 201, a trackline 202 and a PPC 203. The associated FEP is located at 204 and its PAD area is completed in the customary manner. For the purposes of FIG. 11, the periphery of the PAD area 205 for the target 200 in the normal mode of display is drawn with hatched lines. Own ship is located at 6 and its heading marker segments are represented by 23. Own ship speed circle is represented by 83. Two nautical mile range rings are shown at 56. When the predictive bearing cursor mode of operation is entered by pressing button 400 (FIG. 1) a "Trial Mode" symbol (T) 206 appears at the bottom of the PPI display. The bearing cursor 207, which is segmented in the same manner as the heading marker 23, is rotated until it makes contact with the PAD area 205. Immediately, a predictive representation of the PAD area of target 200 is created by computing the location of the FEP based on the same hazard factor rule as before, assuming that own ship 6 adopts the heading represented by the direction of the bearing cursor 207. The predictive FEP for the heading 207 is located at 208.

In accordance with the present invention, the predictive FEP 208 has escape vectors 209 and 210 associated with it, each being terminated at CPA positions 211 and 212, respectively. There is no change in the location of the PPC 203 in the bearing cursor prediction mode and the predictive PAD area is completed by linking points 211 and 212 with the PPC 203 by means of lines 213 and 214. For the purposes of FIG. 11, the predictive PAD periphery is shown by means of continuous lines. In practice, the fact that the PAD area 215 is a predictive representation of hazard on adopting the trial heading 207 can be indicated in a variety of ways, one method for which could be by arranging for the peripheral elements of the PAD area 215 to flash or to be displayed in a readily distinguishable form.

The geometric construction of the predictive PAD area differs only in one material circumstance from that utilized in the normal situation. The FEP 208 requires to be located on the heading 207, rather than on the heading 216 through the PPC 203. The heading 207 is laid off in the reverse direction from the tip 217 of the target's vector 201 and its intersection with own ship's relocated speed circle 218 is established at 219. The relative track 220 is the result of own ship adopting the heading 207 immediately. An FEP circle 221 is drawn about own ship's position 6, representing the locus of the FEP in obedience to the appropriate FEP Rule which is range to target at FEP=1.1 times the pre-selected CPA distance, the radius of CPA circle 26.

The intersection of the predicted relative track 220 with the circle 221 establishes 222 as the predicted position of the target at FEP as seen in relative motion terms. Thereafter, the geometric construction to establish the predicted location 208 of the FEP and the direction and lengths of the two escape vectors 209 and 210 follows established procedures.

The bearing cursor predictive technique will permit further evaluation of hazard in encounters in circumstances in which own ship 6 finds it necessary to approach a PAD symbol but on a heading which is less critical than making the approach on the most critical heading, the heading 216 towards the PPC 203.

Figure 12:
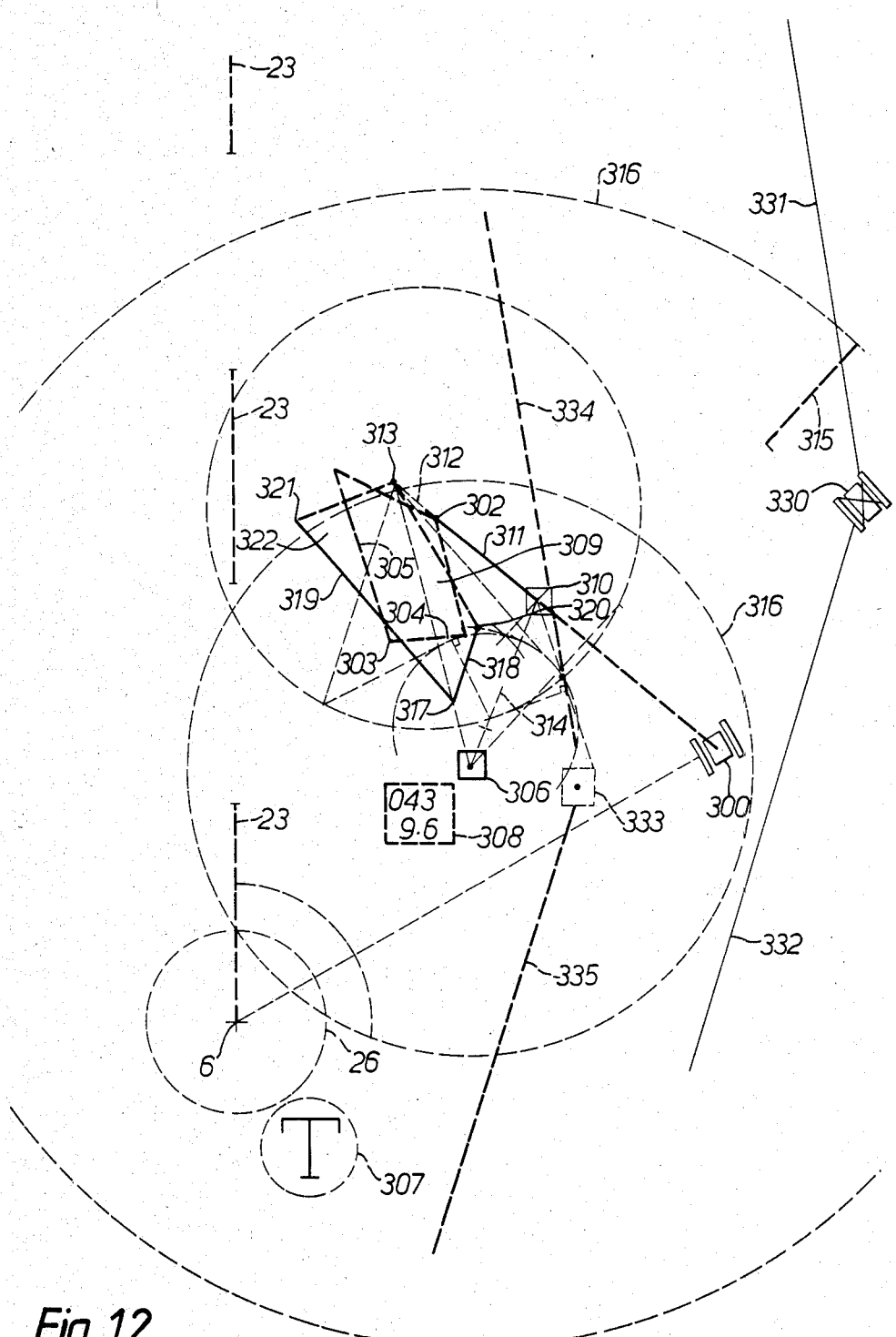

FIG. 12 illustrates the normal and the predictive PPI display formats associated with an acquisition symbol, single step heading maneuver prediction. For the purposes of illustration, the normal display symbology associated with target 300 is shown in a hatched format, comprising trackline 301, PPC 302, FEP 303, escape vectors 304 and 305 and heading marker segments 23.

When the acquisition symbol 306 has been positioned at the location in respect of which a situation evaluation prediction is required and the prediction mode entered by pressing button 401 (FIG. 1), the heading marker segments 23 will be de-emphasised and the range rings 56 inhibited for the duration of the prediction. The heading marker segments may be hatched and/or be of reduced brightness, the "Trial" symbol 307 will appear at the bottom of the PPI, an acquisition symbol location indication 308 will appear, providing the heading to that location assuming an immediate alteration and the time interval in minutes to arrive there based on own ship's actual speed or on an earlier trial speed input to the system. A predictive hatched heading marker chain 315 in the direction of the line from the PPI center 6 to the acquisition symbol 306 will be extended from 306, and hatched concentric range rings 316 will be drawn about 306 as center.

The nominal target's vector 301, the PPC 302 and the PAD area 309 will either be suppressed entirely or displayed with reduced brightness, for example. A symbol 310 represent the predicted location of the target 300 along its trackline 301 for the time interval associated with own ship's predicted position 306 and its associated time interval is displayed. The target's predicted vector 311 is projected ahead and a predicted PPC location 313 is used as the terminal point of the target's hatched trackline 312 based on established geometrical construction procedures and the assumption that the line 314 represents a predicted range bearing of the target for the appropriate time interval of the prediction.

For the predicted own ship location in 9.6 minutes of 306, the predicted FEP is located at 317, from which two predicted escape vectors 318 and 319 emanate, terminating at predicted CPA positions 320 and 321 respectively. The predicted PAD area 322 is completed by hatched lines linking points 320 and 321 with the PPC 313.

Maneuver predictions using the acquisition symbol as a delineator with respect to the position at which the predicted PAD area is compiled can be invoked just as readily to determine the effect of standing-on into an encounter, which is equivalent to exercising the decision not to maneuver. In this case, the acquisition symbol is positioned at an appropriate location on own ship's heading marker 23 and the button 401 pressed. The situation for all PAD areas for the time interval of the trial interrogation is displayed immediately. In keeping with established procedures, trial maneuver investigations will return to the normal real situation display within a pre-fixed time interval unless specific overriding action is taken.

The total situation evaluation prediction may also be conducted in a multi-step for example, two-step or three-stage sequence to represent, for example, a delayed or deferred maneuver. In this case, two locations of the acquisition symbol are defined in succession, the first, for example, being located at the 12-minute point on the heading marker, the second at some other location off the heading marker. This represents a maneuver of a certain magnitude being conducted in 12-minutes time. The parmameters for the predictive mode are generated by a predictive parameter generator shown in broken lines at 402 in FIG. 1.

When the single-step or multiple-step prediction facility associated with the acquisition symbol is used on a collision avoidance apparatus featuring automatically registered digital mapping symbology, called variously Navigation Lines, Navlines or Channel Navigation in common usage, those elements of the map which are shown on the display, typically the identification and tracking symbology associated with navigation marks which have been pre-designated as suitable for radar tracking as a means of position-fixing and line segments representing channel boundaries, restricted area peripheries and coastline markers, will be displayed with reduced brilliance and in hatched line or flashing format to indicate their predictive nature, having being subjected to a trial transformation in a ground stabilised frame of reference equivalent to that to which the targets' collision data has been transformed, as described above.

Representative digital mapping symbology with respect to the real situation of own ship 6 being located at 6, the PPI center is illustrated in FIG. 12. A navigation mark 330 which is being tracked has associated with it digital mapping lines 331 and 332 representing the limits of the navigable channel on the starboard side of own ship. When the acqusition symbol prediction facility is activated the predicted position of own ship 6 will be represented by the symbol 306, from which the predictive heading marker 315 is drawn and about which the re-positioned range rings 316 are described, the predictive position of the navigation mark 330 becomes 333 for the duration of the prediction, from which position the re-located map lines 334 and 335 are drawn. In the prediction illustrated in FIG. 12, therefore, it is apparent immediately that own ship 6 has reached a position permitting only a further 4 minutes steaming before the limits of the channel are reached on the predictive evasive heading.

It will be noticed that the transformation to which own ship's symbology has been subjected, represented by the vector linking the PPI center 6 to the predictive symbol 306, differs from that to which the digital mapping symbology have been subjected, represented by the vector linking 330 to 333. In the first instance, the transformation of the map is in the negative sense with respect to the transformation of own ship 6. The difference in the absolute magnitudes of the transformation vectors occurs by virtue of the fact that the map is moved in a ground stabilized frame of reference. The difference in the absolute values of the two transformations represents the negative of the tidal stream flowing for the prediction time interval, that is the time taken for own ship to progress from position 6 to position 306 in the watermass.

The PAD symbol is displayed by using suitable combinations of broken and continuous line segments, as required. In the illustrated embodiment of the present invention, continuous line segments are used to represent the target vector 24 in FIG. 2 and both own ship heading lines from the FEP 40 to the respective CPA locations 51 and 52, the latter lines forming that part of the PAD periphery nearest own ship, while broken lines are used to represent the target track 18 and the lines from the PPC 19 to the respective CPA positions 51 and 52, the distinction between continuous and broken lines being used to create emphasis on the most important elements of the information being provided to the operator. Slight variations in this display symbology become necessary when both modes of trial maneuver are employed. Alternatively, emphasis could be provided by arranging for color distinction to be a feature of the PPI display 7.

The danger area approach to collision avoidance symbology in both the prior art and in the convention described for implementation of the present invention is eminently suitable to take advantage of the emerging radar video digitization and scan-conversion into TV raster-type signal format for display on monochrome or color monitors. Thus special emphasis can be applied to the region of the predicted area of danger by means of shading or by assigning a specific and recognizable color to such regions, which will be different from the color selected to represent the general watermass surface. Furthermore, similar color distinctions may be applied to distinguish the data which is displayed as a result of undertaking predictions.

The advantages of collision avoidance apparatus in accordance with the present invention are as follows:

1. A more realistic definition of a PAD area since it is defined in terms of its worst case situation, in which own ship is forced to head towards it, by having its nearside periphery defined in terms of the final maneuvers which are necessary, and by indicating where the CPAs will occur. The corollary to this is that own ship is free to maneuver in the open space that exists between it and the nearside PAD periphery.
2. Improved predictability of the consequences of own ship standing on or maneuvering in any direction.
3. Low risk targets are provided with relaxed margins of safety.
4. There is a clear and emphatic distinction between the PAD areas of slower targets and those of faster targets, particularly those faster targets whose dual and primary PAD areas have merged, with emphasis on the present or absence of PPCs, and hence the degree of real risk present.
5. The gradual diminution of risk associated with respect to a clearing faster target is shown unambiguously.
6. The positional elements which compose the nearside periphery of the PAD area are realistically defined throughout all stages of encounters.
7. The restriction upon permitting own ship to intrude into the PAD area is emphatic and permits no experimental tolerance. However, the PAD symbol preserves the realism of the maneuvering information it imparts even in the extreme circumstances in which own ship is forced to approach and intrude into an area declared hazardous, by means of the dynamic response of the nearside peripheral escape vectors which will "wrap around" own ship. The dynamic response of the PAD area created by the invention to deliberate or necessary intrusion by own ship is an extremely valuable aid to practical navigators.
8. Own ship is biased away from danger if early evasive action is taken to pass "in front of" primary PAD areas.
9. The flexibility which exists in the composition of the FEP rules for different categories of target dynamics is of operational benefit and will recommend itself to practical navigators.
10. Better adherence to PPI graphics: the lines drawn as firm lines—the target vector and own ship vectors from the FEP to the CPA positions—are all own ship vectors, length and direction of which are significant.
11. The FEP convention associated with own ship adopting the most critical heading, the heading towards the PPC, the heading which will result in either actual collision or the heading which will result in minimum CPA distance in the case of the non-PPC occluded PAD area, represents a simplification of the display of the fundamental dynamics of the encounter. In reality, any heading adopted towards the PAD area will have an FEP associated with it, but there is a practical limitation to showing all the FEP points if it is considered necessary to advise on the nature of the action to be taken in extremis which is deemed to be an important practical consideration.
12. The technique of using arbitrarily chosen constants in the derivation of the FEP Rules can be extended to provide facilities to introduce additional margin of safety allowances when calculating the direction and magnitude of the escape vectors emanating from the FEP, and further to provide user facilities to increase these ratios by means of additional safety margin ratios to be applied to these values to reflect user's assessment of the optimum criteria in any given operating circumstances.
13. Sensitive and highly accurate predictions of the effects of maneuvers to be conducted by own ship can be accomplished by means of assigning additional operational modes to the electronic bearing cursor as one means and to the special target acquisition symbol as a second means, using a single or multi-step approach in the latter case.
14. Throughout the sequence of events of an encounter with a faster target, by virtue of the specific FEP Rules used for targets of this category, the location of the distance apices of the duplex PAD area, or the distant apex of the occluded PAD area, provides an accurate representation of the relative locations of own ship and the target at CPA assuming that own ship adopts a heading from the FEP towards that apex or apices, or, in the case of the occluded PAD area, own ship adopts a heading directly towards the apex.
15. Use can be made of colour displays to provide a still further enhanced picture to the operator.

I claim:

1. In apparatus for assessing maneuvers of a first vehicle relative to other vehicles comprising sensing means for providing signals representative of the positions and velocities of the other vehicles relative to the first vehicle, symbology generating means responsive to said signals for generating symbology respectively associated with the other vehicles, and display means coupled to the symbology generating means for displaying the symbology relative to the position of the first vehicle so as to provide indicia to assess maneuvers of the first vehicle which will avoid collision with the other vehicles, and which will ensure that the first vehicle will not pass closer to the other vehicles than a predetermined distance for all relative positions and velocities thereof, said symbology generating means comprising means for generating symbology associated with each of the other vehicles in all encounter circumstances with at least a final escape point (FEP) which, if reached by the first vehicle, will allow the first vehicle still to avoid the associated other vehicle by said predetermined distance, and two vectors, originating at the FEP, which if taken by the first vehicle at the FEP, will take the first vehicle clear ahead or clear astern of said other vehicle by said predetermined distance.

2. Apparatus according to claim 1, wherein said symbology generating means comprises means for generating said symbology associated with each of the other vehicles in the form of at least one closed region representing a predicted area of danger (PAD area), the periphery of the region being defined by lines joining points which are determined according to the hazard category of the other vehicles but in each case said points including the FEP and end points of said vectors representing the two clearing headings originating at the FEP, said end points representing the position of the vehicle when the closest point of approach (CPA) occurs with respect to the other vehicle, said CPA being determined by said predetermined distance.

3. Apparatus according to claim 2, wherein said points include a possible point of collision (PPC) of the first vehicle with the other vehicle if said PPC exists.

4. Apparatus according to any of claims 1 to 3, wherein said symbology generating means comprises means for symbology generating said symbology with the FEP determined according to the following rules:
1. for faster intruding vehicles possessing duplex PAD areas, the FEPs are located at the particular point along the directions of headings towards either PPC representing the final position from which a heading is available to the first vehicle from which the first vehicle can pass clear ahead of the intruding vehicle with the predetermined CPA distance,
2. for a slower intruding vehicle, the ratio of the speed of which with respect to the speed of the first vehicle is greater than a predetermined constant, and the aspect angle of which is less than a right angle, the FEP is the particular point along the direction of the heading towards the single PPC at which the range to the intruding vehicle bears a fixed ratio with respect to the preselected CPA distance,
3. for a slower intruding vehicle the ratio of the speed of which with respect to the speed of the first vehicle is less than a predetermined constant, or the aspect angle of which is greater than a right angle, the FEP is the particular point along the direction of the heading towards the PPC at which the range to the intruding vehicle bears a fixed ratio to the preselected CPA distance, which fixed ratio is less than that of Rule 2,
4. for a faster intruding vehicle displaying duplex PAD areas, each having a FEP, at the moment when the nearer of the two FEPs approaches to a range from the first vehicle which bears a fixed ratio to the pre-selected CPA distance in a situation in which the heading of the first vehicle lies outside the sector established by the primary and dual CPA positions related to the target passing astern, entering which sector is equivalent to the first vehicle crossing the bow of the faster intruding vehicle, the Rule for the range to the target at FEP will be changed from that established by Rule 1 to one which will ensure that the final CPA distance which will result from the first vehicle altering its heading on reaching the FEP to a heading parallel to the intruder's heading will bear a fixed ratio to the pre-selected CPA distance,
5. if the heading of the first vehicle lies within the sector defined in Rule 4, indicating the intention of the first vehicle to cross ahead of the intruding vehicle, as the range to the nearer FEP reaches a predetermined amount greater than the preselected CPA distance, Rule 1 will be maintained or re-established if possible until the duplex PAD areas of the intruding vehicle merge at a position along its trackline which is determined by the intersection of the trackline with the predicted heading of the first vehicle, which will occur some time after the first vehicle has crossed the bow of the intruding vehicle, thereupon the FEP Rule will be changed to the relationships established by Rule 4.

5. Apparatus according to claim 4, wherein the predetermined constant and said fixed ratio of Rule 2 are ⅓ and 1.5:1, respectively, the predetermined constant and fixed ratio of Rule 3 are ⅓ and 1.1:1, respectively, the fixed ratio of Rule 4 is 1.1:1, and the predetermined amount of Rule 5 is 1.1 times the selected CPA distance.

6. Apparatus according to claim 2, wherein the two vectors originating at the FEP are in the form of straight lines representing the actual length and direction of vectors of the first vehicle which are necessary to achieve the predetermined CPA, assuming that the first vehicle has reached the FEP.

7. Apparatus according to claim 2, wherein the nearside periphery, with respect to the first vehicle, of the PAD area maintains fixed proportions throughout the time that the first vehicle heads towards the PAD area on the identified most critical heading.

8. Apparatus according to claim 2, wherein the form of the PAD area is such as to confirm the presence or absence of one or two points of possible collision.

9. Apparatus according to claim 2 wherein said symbology generating means includes means for eliminating the option of the first vehicle passing in front of a faster other vehicle on an evasive heading that passes between the primary and dual PAD areas of the other vehicle in those circumstances in which the first vehicle has not selected the option to pass in front of the other vehicle, the option being eliminated at a time earlier than that required by the geometry of the encounter and the appropriate FEP Rule for faster targets.

10. Apparatus according to claim 2, wherein said symbology generating means includes predictive mode means for providing predictive symbology resulting from initiating a trial heading or a trial repositioning of the symbology of the first vehicle relative to the symbology of another vehicle, said predictive symbology being displayed simultaneously with real situation symbology for a predetermined time interval, together with appropriate predictive relocation of any digital map element being displayed at that time.

11. Apparatus according to claim 10, wherein the predictive symbology is displayed differently from the real situation symbology, whereby the two symbologies are readily distinguished.

12. Apparatus according to claim 10 or 11 in which said predictive mode means includes means for trial repositioning of the symbology of the first vehicle relative to the symbology of another vehicle in a single-step or multi-step operation.

13. Apparatus according to claim 2 wherein said symbology generating means includes means for establishing predetermined ratios to link the dimensions of a PAD area to the risk potential of the associated vehicle and for moderating said predetermined ratios by applying preselected additional ratio to increase the margin of safety.

14. Apparatus according to claim 1, wherein the symbology generating means comprise a computer having a two way link with a track-while-scan system, and a timer, an output from the computer being connected to a symbol generator having an output in turn connected to the display means and having a two-way link with the timer, the symbology generating means further comprising control means connected between the display means, on the one hand, and the track-while-scan system and the computer, on the other hand.

* * * * *